(12) United States Patent
Savchenko

(10) Patent No.: US 11,222,233 B2
(45) Date of Patent: Jan. 11, 2022

(54) METHOD AND APPARATUS FOR MULTI-CATEGORY IMAGE RECOGNITION

(71) Applicant: SAMSUNG ELECTRONICS CO., LTD., Suwon-si (KR)

(72) Inventor: Andrey Vladimirovich Savchenko, Nizhny Novgorod (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 16/584,250

(22) Filed: Sep. 26, 2019

(65) Prior Publication Data
US 2020/0097762 A1    Mar. 26, 2020

(30) Foreign Application Priority Data

Sep. 26, 2018 (RU) .............................. RU2018133931
Jan. 25, 2019 (RU) .............................. RU2019102032

(51) Int. Cl.
*G06K 9/00* (2006.01)
*G06K 9/62* (2006.01)
*G06K 9/46* (2006.01)
*G06N 3/04* (2006.01)
*G06N 3/08* (2006.01)

(52) U.S. Cl.
CPC .............. *G06K 9/6247* (2013.01); *G06K 9/46* (2013.01); *G06K 9/627* (2013.01); *G06K 9/6256* (2013.01); *G06K 9/6261* (2013.01); *G06N 3/04* (2013.01); *G06N 3/08* (2013.01)

(58) Field of Classification Search
CPC ...... G06K 9/6247; G06K 9/46; G06K 9/6261; G06K 9/6256; G06K 9/627; G06K 9/38; G06K 9/6407; G06K 9/2009; G06K 9/6423; G06N 3/04; G06N 3/08; G06F 17/30249; G06T 7/0081; G06T 7/0083; G06T 7/001; G06T 2207/20144; G06T 2207/10016

See application file for complete search history.

(56) References Cited

U.S. PATENT DOCUMENTS

| | | | |
|---|---|---|---|
| 9,066,054 B2 * | 6/2015 | Mestha | H04N 1/56 |
| 10,025,950 B1 | 7/2018 | Avasarala et al. | |
| 10,032,281 B1 * | 7/2018 | Ghesu | G06N 7/005 |
| 10,289,897 B2 * | 5/2019 | Tang | G06K 9/6215 |

(Continued)

FOREIGN PATENT DOCUMENTS

RU    2622874 C1    6/2017

OTHER PUBLICATIONS

Communication dated Oct. 18, 2019, issued by the Russian Intellectual Property Office in counterpart Russian Application No. 2019102032.

(Continued)

*Primary Examiner* — Amir Alavi
(74) *Attorney, Agent, or Firm* — Sughrue Mion, PLLC

(57) ABSTRACT

A method and apparatus for image recognition are provided. The method includes: obtaining a vector of deep features of an input image; applying a Principal Component Analysis (PCA) transformation to the vector of the deep features; obtaining a sequence of principal components of the input image; dividing the sequence of the principal components into a predefined number of adjacent parts; and matching the input image to instances from a training image set.

18 Claims, 11 Drawing Sheets

(56) References Cited

U.S. PATENT DOCUMENTS

| | | | |
|---|---|---|---|
| 10,417,532 B2 * | 9/2019 | Liang | G06K 9/4628 |
| 10,742,475 B2 * | 8/2020 | Lai | H04B 1/38 |
| 10,839,315 B2 * | 11/2020 | Bezzubtseva | G06N 20/00 |
| 2016/0171346 A1 | 6/2016 | Han et al. | |
| 2016/0358024 A1 | 12/2016 | Krishnakumar et al. | |
| 2017/0032224 A1 | 2/2017 | Zhang et al. | |
| 2018/0060687 A1 | 3/2018 | Wang | |
| 2019/0042895 A1 * | 2/2019 | Liang | G06K 9/00288 |
| 2020/0019759 A1 * | 1/2020 | Savchenko | G06N 3/0454 |
| 2020/0097762 A1 * | 3/2020 | Savchenko | G06K 9/6261 |
| 2020/0159766 A1 * | 5/2020 | Volkovs | G06F 16/9024 |

OTHER PUBLICATIONS

Deng et al., "A Decision-Theoretic Rough Set Approach to Multi-class Cost-Sensitive Classification", 2016, pp. 250-260, 11 pages total.

Zhang et al., "A Dynamic Three-way Decision Model based on the Updating of Attribute Values", Knowledge-Based Systems, 2018, pp. 71-84, 14 pages total.

Wu et al., "A Light CNN for Deep Face Representation with Noisy Labels", Journal of Latex Class Files, vol. 14, No. 8, Aug. 2017, pp. 1-13, 13 pages total.

Liu et al., "A Multiple-category Classification Approach with Decision-theoretic Rough Sets", Fundamenta Informaticae, 115, 2012, pp. 173-188, 16 pages total.

Yang et al., "A unified framework of dynamic three-way probabilistic rough sets", Information Sciences, 420, 2017, pp. 126-147, 22 pages total.

Yang et al., "A unified model of sequential three-way decisions and multilevel incremental processing", Knowledge-Based Systems, 134, 2017, pp. 172-188, 17 pages total.

Yao et al., "Attribute reduction in decision-theoretic rough set models", Information Sciences, 178, 2008, pp. 3356-3373, 18 pages total.

Razavian et al., "CNN Features off-the-shelf: an Astounding Baseline for Recognition", 2014, pp. 806-813, 8 pages total.

Prince, "Computer vision: models, learning and inference", Jul. 7, 2012, 647 pages total.

Benjamini et al., "Controlling the False Discovery Rate: a Practical and Powerful Approach to Multiple Testing", J. R. Statist. Soc. B, 57, No. 1, 1995, pp. 289-300, 13 pages total.

Yu et al., "Convolutional networks with cross-layer neurons for image recognition", Information Sciences, 433-434, 2018, pp. 241-254, 14 pages total.

Li et al., "Cost-sensitive sequential three-way decision modeling using a deep neural network", International Journal of Approximate Reasoning, 85, 2017, pp. 68-78, 11 pages total.

Pedrycz et al., "Data description: A general framework of information granules", Knowledge-Based Systems, 80, 2015, pp. 98-108, 11 pages total.

Parkhi et al., "Deep Face Recognition", 2015, pp. 1-12, 12 pages total.

Goodfellow et al., "Deep Learning", 2016, 804 pages total.

Lowe, "Distinctive Image Features from Scale-Invariant Keypoints", International Journal of Computer Vision, Jan. 5, 2004, pp. 1-28, 28 pages total.

Masi et al., "Do We Really Need to Collect Millions of Faces for Effective Face Recognition?", Apr. 11, 2016, pp. 1-18, 18 pages total.

Long et al., "Face recognition with a small occluded training set using spatial and statistical pooling", Information Sciences, 430-431, 2018, pp. 634-644, 11 pages total.

Savchenko, "Fast multi-class recognition of piecewise regular objects based on sequential three-way decisions and granular computing", Knowledge-Based Systems, 91, 2016, pp. 252-262, 11 pages total.

Szczuka et al., "Feedforward neural networks for compound signals", Theoretical Computer Science, 412, 2011, pp. 5960-5973, 14 pages total.

Savchenko et al., "Fuzzy Analysis and Deep Convolution Neural Networks in Still-to-video Recognition", Optical Memory and Neural Networks, vol. 27, No. 1, 2018, pp. 23-31, 9 pages total.

Szegedy et al., "Going Deeper with Convolutions", 2015, pp. 1-9, 9 pages total.

Yao, "Granular Computing and Sequential Three-Way Decisions", 2013, pp. 1-13, 13 pages total.

Kullback, "Information Theory and Statistics", 1978, 409 pages total.

Savchenko et al., "Information-Theoretic Analysis of Efficiency of the Phonetic Encoding-Decoding Method in Automatic Speech Recognition", Theory and Methods of Signal Processing, Journal of Communications Technology and Electronics, vol. 61, No. 4, 2016, pp. 430-435, 6 pages total.

Learned-Miller et al., "Labeled Faces in the Wild: A Survey", Apr. 2, 2016, pp. 1-55, 55 pages total.

Yi et al., "Learning Face Representation from Scratch", Nov. 28, 2014, 9 pages total.

Savchenko, "Maximum-likelihood approximate nearest neighbor method in real-time image recognition", Pattern Recognition, 61, 2017, pp. 459-469, 11 pages total.

Zhou, "Multi-class decision-theoretic rough sets", International Journal of Approximate Reasoning, 55, 2014, pp. 211-224, 14 pages total.

Pillai et al., "Multi-label classification with a reject option", Pattern Recognition, vol. 46, Issue 8, Aug. 2013, pp. 2256-2266, 28 pages total.

Lu et al., "Multilevel Decision-Making: A Survey", Jun. 10, 2016, pp. 1-44, 44 pages total.

Hochberg et al., "Multiple Comparison Procedures", 1987, 19 pages total.

Khosla et al., "Novel Dataset for Fine-Grained Image Categorization: Stanford Dogs", 2 pages total.

Chow, "On Optimum Recognition Error and Reject Tradeoff", Artificial Intelligence Memo. No. 175, Apr. 1969, pp. 1-36, 35 pages total.

Fei-Fei et al., "One-Shot Learning of Object Categories", IEEE Transactions on Pattern Analysis and Machine Intelligence, vol. 28, No. 4, Apr. 2006, pp. 594-611, 18 pages total.

Lingras et al., "Rough Multi-category Decision Theoretic Framework", 2008, pp. 676-683, 8 pages total.

Slezak, "Rough Sets and Bayes Factor", 2005, pp. 202-229, 28 pages total.

Savchenko, "Search Techniques in Intelligent Classification Systems", Springer Briefs in Optimization, 2016, 92 pages total.

Wald, "Sequential Tests of Statistical Hypotheses", 1945 (original version; reprint version 1992), pp. 117-186, 70 pages total.

Li et al., "Sequential three-way decision and granulation for cost-sensitive face recognition", Knowledge-Based Systems, 91, 2016, pp. 241-251, 11 pages total.

Savchenko, "Sequential Three-Way Decisions in Efficient Classification of Piecewise Stationary Speech Signals", Springer International Publishing AG, 2017, pp. 264-277, 14 pages total.

Yao et al., "Sequential Three-way Decisions with Probabilistic Rough Sets", Information Sciences, Feb. 2010, 7 pages total.

Burghouts et al., "The Distribution Family of Similarity Distances". Dec. 2-4, 2007, pp. 1-8, 8 pages total.

Yao, "Three-way decisions with probabilistic rough sets", Information Sciences, vol. 180, No. 3, pp. 341-353, 2010, 27 pages total.

Simonyan et al., "Very Deep Convolutional Networks for Large-Scale Image Recognition", Apr. 10, 2015, pp. 1-14, 14 pages total.

* cited by examiner (a)      (b)      (c)      (d)

METHOD AND APPARATUS FOR MULTI-CATEGORY IMAGE RECOGNITION

CROSS-REFERENCE TO RELATED APPLICATION(S)

This application is based on and claims priority under 35 U.S.C. § 119 to Russian Patent Application No. 2018133931, filed on Sep. 26, 2018, in the Russian Patent Office, and Russian Patent Application No. 2019102032, filed on Jan. 25, 2019, in the Russian Patent Office, the disclosures of which are incorporated by reference herein in their entireties.

BACKGROUND

1. Field

The disclosure relates to multi-category image recognition, and in particular, to a device and method for multi-category image recognition using sequential analysis of deep features.

2. Description of Related Art

Computer-aided image recognition systems have recently received increased attention due to their efficiency in various areas including biometrics, medical diagnosis, autonomous cars, contextual advertising, etc.

SUMMARY

Provided are an image recognition device and an image recognition method that uses sequential analysis of deep features.

Additional aspects will be set forth in part in the description which follows and, in part, will be apparent from the description, or may be learned by practice of the presented embodiments.

According to an aspect of the disclosure, a method of image recognition includes: obtaining a vector of deep features of an input image; applying a Principal Component Analysis (PCA) transformation to the vector of the deep features; obtaining a sequence of principal components of the input image; dividing the sequence of the principal components into a predefined number of adjacent parts; and matching the input image to instances from a training image set.

The method may further include: extracting the deep features of the input image; and normalizing the obtained vector of the deep features.

The predefined number of the adjacent parts may be a predefined number of granularity levels and each of the predefined number of the adjacent parts is associated with each of the predefined number of the granularity levels.

Each of the predefined number of the adjacent parts may have a same size m.

The predefined number of the granularity levels may be determined by dividing a dimension of the vector of the deep features by the size m.

The matching of the input image to the instances may include performing a loop from l=1 to l=m (where 1≤l≤m, and l represents a fine degree of the granularity levels), and the performing of the loop may include: appending 1-th (where 1≤l≤m) part of the sequence of the principal components of the input image to a subsequence of the principal components of the input image, wherein m is a size of the predefined number of the adjacent parts; computing distances between the subsequence and respective subsequences of principal components of the instances; calculating ratios of a minimum distance to the computed distances; excluding instances having a calculated ratio that is less than a predefined threshold; and identifying the input image as a relevant image in a class if, from the class, at least one instance having a calculated ratio that is greater than or equal to the predefined threshold exists and terminating the loop or identifying the input image as the relevant image in the class if, among the instances, an instance from a class having a greatest ratio when the granularity level reaches l=m.

The method may further include: obtaining the vector of the deep features for each of the instances from the training image set; normalizing the vector of the deep features for the each of the instances; applying the PCA transformation to the vector of the deep features for the each of the instances to obtain a transformation matrix; and obtaining a sequence of principal components for the each of the instances by multiplying the transformation matrix by the vector of the deep features for the each of the instances.

The obtaining of the vector of the deep features for the each of the instances from the training image set may be performed by a deep Convolutional Neural Network (CNN).

The transformation matrix may be a square matrix having dimensions equivalent to a dimension of the vector of the deep features.

The obtaining of the sequence of the principal components of the input image may include: obtaining the sequence of the principal components of the input image by multiplying a transformation matrix by the vector of the deep features of the input image.

According to another aspect of the disclosure, an apparatus for image recognition includes: a memory configured to store an input image; and a processor configured to execute instructions to: obtain a vector of deep features of the input image, apply a Principal Component Analysis (PCA) transformation to the vector of the deep features, obtain a sequence of principal components of the input image, divide the sequence of the principal components into a predefined number of adjacent parts, and match the input image to instances from a training image set.

The processor may be further configured to execute the instructions to: extract the deep features of the input image; and normalize the obtained vector of the deep features.

The predefined number of the adjacent parts may be a predefined number of granularity levels and each of the predefined number of the adjacent parts is associated with each of the predefined number of the granularity levels.

Each of the predefined number of the adjacent parts may have a same size m.

The predefined number of the granularity levels may be determined by dividing a dimension of the vector of the deep features by the size m.

The processor may be further configured to execute the instructions to perform the matching of the input image to the instances by performing a loop from l=1 to l=m (where 1≤l≤m, and l represents a fine degree of the granularity levels), the loop including: appending 1-th (where 1≤l≤m) part of the sequence of the principal components of the input image to a subsequence of the principal components of the input image, wherein m is a size of the predefined number of the adjacent parts; computing distances between the subsequence and respective subsequences of principal components of the instances; calculating ratios of a minimum distance to computed distances; excluding instances having a calculated ratio that is less than a predefined threshold; and identifying the input image as a relevant image in a class if, from the class, at least one instance having a calculated ratio that is greater than or equal to the predefined threshold exists and terminating the loop or identifying the input image as the relevant image in the class if, among the instances, an instance from a class having a greatest ratio when the granularity level reaches l=m.

The processor may be further configured to execute the instructions to: obtain the vector of the deep features for each of the instances from the training image set, normalize the vector of the deep features for the each of the instances, apply the PCA transformation to the vector of the deep features for the each of the instances to obtain a transformation matrix, and obtain a sequence of principal components for the each of the instances by multiplying the transformation matrix by the vector of the deep features for the each of the instances.

The transformation matrix may be a square matrix having dimensions equivalent to a dimension of the vector of the deep features.

The processor may be further configured to execute the instructions to obtain the sequence of the principal components of the input image by multiplying a transformation matrix by the vector of the deep features of the input image.

According to another aspect of the disclosure, a non-transitory computer readable medium stores instructions that, when executed by at least one processor, cause the at least one processor to control for: obtaining a vector of deep features of an input image; applying a Principal Component Analysis (PCA) transformation to the vector of the deep features; obtaining a sequence of principal components of the input image; dividing the sequence of the principal components into a predefined number of adjacent parts; and matching the input image to instances from a training image set.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
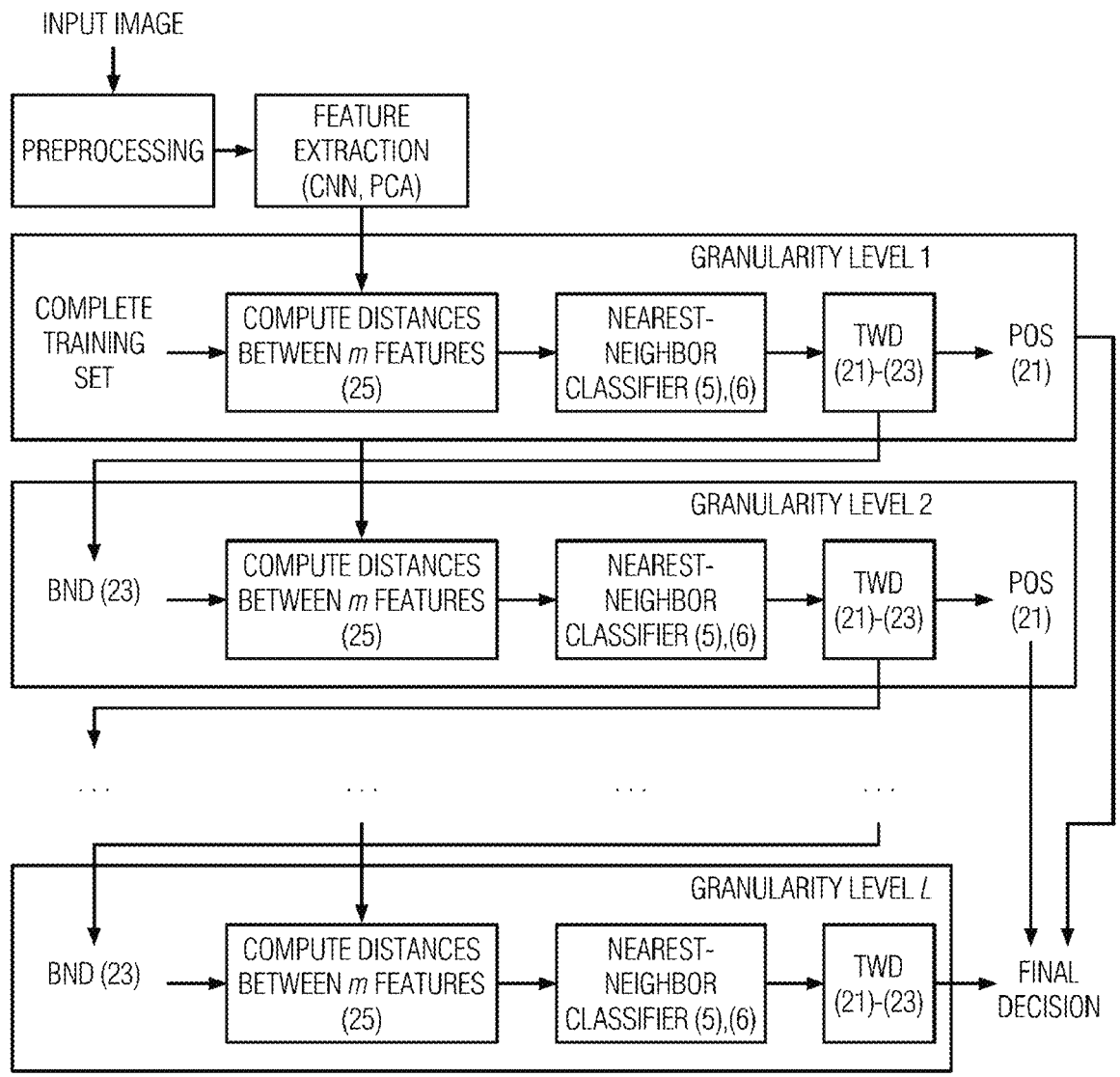
FIG. 1 illustrates a proposed pipeline for the multi-category image recognition based on sequential three-way decisions (TWD) and granular computing according to an embodiment.

The following description with reference to the accompanying drawings is provided to assist in a comprehensive understanding of various embodiments as defined by the claims and their equivalents. The description includes various specific details to assist in that understanding but these are to be regarded as merely exemplary. Accordingly, those of ordinary skill in the art will recognize that various changes and modifications of embodiments described herein can be made without departing from the scope of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of embodiments. Accordingly, it should be apparent to those skilled in the art that the following description of certain embodiments is provided for illustration purpose only.

It is to be understood that the singular forms "a," "an," and "the" include plural referents unless the context clearly dictates otherwise. Thus, for example, reference to "a" or "the processor" includes reference to one or more processors.

It will be understood that, although the terms first, second, etc., may be used herein in reference to elements of the disclosure, such elements should not be construed as limited by these terms. The terms are used only to distinguish one element from other elements.

It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In various embodiments, "module" or "unit" may perform at least one function or operation, and may be implemented with hardware, software, or a combination thereof. "Plurality of modules" or "plurality of units" may be implemented with at least one processor through integration thereof with at least one module other than a "module" or "unit" that needs to be implemented with specific hardware.

It is understood that, hereinafter, expressions such as "at least one of," when preceding a list of elements (e.g., "at least one of A and B" or "at least one of A or B"), modify the entire list of elements (i.e., only A, only B, or both A and B) and do not modify the individual elements of the list.

The objective of a multi-category image recognition task is to assign an object presented in an image to any of C>2 possible classes (categories). It is a challenging problem in many intelligent systems due to variability of either objects (pose, size, etc.) or conditions of observations (illumination, occlusion, noise, etc.). The best results in many contexts are obtained using feed-forward neural networks with deep architecture, such as Convolutional Neural Networks (CNN). The situation becomes much more complicated if a training database of an information system contains a small number of images for each category. Here, the most popular solutions are transfer learning and domain adaptation techniques in which a deep CNN is trained with a very large external dataset, and the output of one of the last layers of this network for an input image is used as its feature vector.

If the size of a training sample is relatively small, an error rate of traditional classifiers, e.g., support vector machine (SVM) or random forest (RF), is usually too high. In such a case, the instance-based learning approach can be applied, e.g., the nearest neighbor (NN) method or a statistical approach, in which the Bayesian or Maximum A-Posteriori (MAP) methods are used to make a decision. Unfortunately, if images are to be recognized in real time (e.g., video-based face recognition), a feature vector is high-dimensional, a similarity measure is complex, and/or only standard hardware (e.g., a laptop or even a mobile phone) is available, performance of an exhaustive search through the set of all classes is not enough even for hundreds of categories.

One possible way to improve recognition performance is the usage of three-way decisions (TWD) which originate from the decision-theoretic rough set (DTRS) model. Unlike a related art two-way decision, TWD introduces an optional delay decision. For example, in still-to-video recognition, it may not be possible to classify a video frame reliably. Hence, the decision can be delayed until a next frame is processed.

It is worth noting that the delay decision is inappropriate in most closed-set image recognition tasks in which one of given categories must be chosen. At first sight, the TWD theory based on the Bayesian approach cannot help in this case, as it is impossible to improve accuracy of (optimal) MAP decisions. However, the combination of TWD and granular computing theory in the context of multiple levels of image approximations (granularity) seems very promising in this context. This gives flexibility of further examining suspicious objects at various granularity levels, thereby reducing the chance of a wrong decision. In fact, it is the key idea of deep CNNs that automatically learn a hierarchy of visual features.

Inspired by the sequential statistical analysis and the granular computing perspective on TWD, the sequential TWD based on probabilistic rough sets and totally ordered relation is proposed. The sequential TWD is a dynamic decision-making procedure in which special attention is paid for the updating strategy to reduce run-time complexity. According to the idea of the sequential TWD, it is necessary to assign three decision regions at each granularity level and examine finer granulation levels with more detailed information only when there is a need for doing so.

Despite the potential of the sequential TWD, applications thereof in image recognition are still under active research. As a matter of fact, most of the multiclass TWDs have not been tested in complex classification tasks in an unconstrained environment. In fact, there exist several studies devoted to image recognition where only rather simple constrained face recognition tasks have been examined. For example, Li et al represented a facial image at each granularity level by using modification of the related art subspace model, and demonstrated that the sequential analysis can improve accuracy for several benchmarks. Savchenko proposed to improve performance of image recognition by the sequential analysis of a pyramid of traditional Histograms of Oriented Gradients (HOG) visual features. As a result, both methods cannot be directly applied with contemporary CNN-based techniques that are the only one rather accurate option for unconstrained environments. Even the recent study of Li et al. is focused on simple feed-forward auto encoder networks by correcting losses in extracting sequential granular features, and did not consider much more accurate deep CNNs. There are presently no TWD-based methods with simple tuning of parameters that would be suitable for application with the related art deep feature extraction methods.

One or more embodiments are directed towards a statistical approach to image recognition and provide the multi-category TWD that is optimal from the point of view of the multiple comparisons theory. This multi-category TWD is used in the novel sequential recognition technique that is based on defining information granules in deep CNN features by using the principal component analysis (PCA). The potential of the approach to improve recognition performance is demonstrated in experiments with many image benchmarks and contemporary CNNs.

One or more embodiments discover possible ways to implement the multi-category TWD in image recognition with deep CNN features. It has been experimentally demonstrated that it is very difficult to tune parameters of existing methods with analysis of either posterior probability or likelihood ratio so that the obtained thresholds are suitable for rather different datasets. Hence, the novel definition of the multi-category TWD is provided based on computing the ratio of distances between input object and instances from a training set. It has been shown that this definition is rather robust to the choice of parameters. In fact, all the results (see Table 1, Table 2 and FIGS. 8-11 below) were obtained for a fixed value of threshold $\delta_{1/*}$. Moreover, it is emphasized that the distance ratio is in good agreement with the related art testing for reliability of SIFT descriptor's matching.

It is demonstrated herein that there is no reason to use the multi-category TWD in image recognition when only one class label should be obtained for an observed image. As a matter of fact, it is impossible to improve the Bayesian decision in such a scenario. According to the disclosure, the real strength of TWD in this task can be found in its combination with the theories of granular computing and sequential TWD. Though there exist studies that demonstrate the possibility to improve accuracy of face recognition, one or more embodiments improve and increase performance of image classification. The novel technique is underlain by the PCA-based definition of granularity levels. It has been shown that in such case it is possible to reuse distances computed at previous levels (25), so that run-time complexity of processing of each level is identical. Experiments with several datasets of faces and image categories have confirmed superiority of the proposed approach over other NN-based methods, including related art implementations of multi-class TWD.

1. Statistical Image Recognition

The task of the closed-set multi-category image recognition is to assign an observed image to one of C>2 classes (C: categories). The classes are specified by a training set of R≥C (R: reference instances). In one or more embodiments, the supervised learning case may be considered, when a class label $c(r) \in \{1, \ldots, C\}$ of an r-th image is known. It is assumed herein that a training sample is rather small (C≈R) to train a complex classifier (e.g., a deep neural network) from scratch. Hence, transfer learning or domain adaptation can be applied. In these methods, large external datasets, e.g., ImageNet or CASIA-WebFaces, are used to train a deep CNN. Next, an input image and all training images from a limited sample of instances are resized in order to have the same width W and height H. These images are fed to the preliminarily trained CNN in order to extract features using outputs of one of its last layers. The $L_1$-normalized outputs for the input image and each r-th reference image are used as D-dimensional feature vectors $x=[x_1, \ldots, x_D]$ and $x_r=[x_{r;1}, \ldots, x_{r;D}]$, respectively. Such deep learning-based feature extractors allow to train a general classifier, e.g., SVM, RF, or simple NN, that performs nearly as well as if a large dataset of images from these C classes is available.

If the ReLU activation functions are used in the CNN, the extracted feature vectors are positive and sum to 1 due to $L_1$-normalization. As a result, the feature vectors of the input image and each r-th instance can be treated as estimates of discrete probability distributions of (hypothetical) random variables X and $X_r$, $r \in \{1, \ldots, R\}$, respectively. The recognition task is reduced to the problem of testing a simple statistical hypothesis about the distribution of X. The optimal MAP decision returns a class corresponding to the maximal probability P(c|x). It is typical for the small sample size problem to assume that each instance in the training set represents a mode in probability density of the whole class. Hence, P(c|x) can be estimated using Bayes' rule:

$$\hat{P}(c|x) = \frac{\max_{r \in \{1,\ldots,R\}, c(r)=c} f_r(x) \cdot p_c}{\sum_{i=1}^{C} \max_{r \in \{1,\ldots,R\}, c(r)=i} f_r(x) \cdot p_i}, \quad (1)$$

where $p_c$ is the prior probability of a c-th class and $f_r(x)$ is the unknown probability density function (likelihood) of $X_r$. By using the ideas of representation learning, the outputs of the last layers of the deep CNN can be treated as independent random variables. Hence, density $f_r(x)$ is estimated as follows:

$$f_r(x) = \prod_{d=1}^{D} (x_{r;d})^{n \cdot x_d}, \quad (2)$$

where n is the sample size used to estimate the distribution of random variable X. It can be computed as the total number of pixels in input image WH. By substituting (2) in (1) and dividing its numerator and denominator to $$\prod_{d=1}^{D} (x_d)^{n \cdot x_d},$$

one can obtain the following estimate of the posterior probability:

$$\hat{P}(c|x) = \frac{\max_{r \in \{1,\ldots,R\}, c(r)=c} \exp\left(-n \cdot \sum_{d=1}^{D} x_d \ln \frac{x_d}{x_{r;d}}\right) \cdot p_c}{\sum_{i=1}^{C} \max_{r \in \{1,\ldots,R\}, c(r)=i} \exp\left(-n \cdot \sum_{d=1}^{D} x_d \ln \frac{x_d}{x_{r;d}}\right) \cdot p_i}, \quad (3)$$

or $$\hat{P}(c|x) = \frac{\max_{r \in \{1,\ldots,R\}, c(r)=c} \exp(-n \cdot \rho_{KL}(x, x_r)) \cdot p_c}{\sum_{i=1}^{C} \max_{r \in \{1,\ldots,R\}, c(r)=i} \exp(-n \cdot \rho_{KL}(x, x_r)) \cdot p_i}, \quad (4)$$

where $\rho_{KL}(x, x_r)$ is the KL divergence between feature vectors x and $x_r$. In fact, this expression is equivalent to the softmax output with the smoothing factor n. Hence, the MAP criterion can be written in the simplified form:

$$c_1(x) = \operatorname*{argmin}_{c \in \{1,\ldots,C\}} \rho_c(x), \quad (5)$$

where the distance between input image and the c-th class is denoted as $$\rho_c(x) = \min_{r \in \{1,\ldots,R\}, c(r)=c} \rho_{KL}(x, x_r) - \ln p_c. \quad (6)$$

The known fact about equivalence of the MAP criterion and the KL minimum information discrimination principle for multinomial distributions should be noticed. Criterion (5) implements the related art NN rule that is typical to the small sample size problem. Run-time complexity of the NN classifier is defined as O(RD). As the dimensional size D of deep features is usually rather high (256 . . . 4096), this method cannot be implemented in real-time if the count of different classes C (and, hence, the training set size R) is large. Below, one or more embodiments are described to improve recognition performance by using the TWD theory.

2. Multi-Category Three-Way Decisions in Image Recognition

This section discusses possibilities to use TWD in the described procedure of image recognition. Three basic options of acceptance, rejection, and non-commitment are best interpreted in the binary classification task. It includes three decision types: positive (accept the first class), negative (reject the first class and accept the second class), and boundary (delay the final decision and do not accept either first or second class). Thus, the concept of class is naturally mapped to the TWD theory: each c-th class is represented by positive POS, negative NEG, and boundary BND pair-wise disjoint regions.

Though TWD cannot directly deal with the multi-category problems, there are several opportunities to incorporate TWD using multi-class DTRS. For instance, Rough multi-category decision theoretic framework (2008) by Lingras et al. discussed the one-versus-one approach to the multiclass Bayesian decision procedure, and specially constructed $2^C$-1 cost functions. They argued that the one-versus-one multi-classification creates a large number of models and can provide low training speed due to a small amount of training data for each model. "A multiple-category classification approach with decision-theoretic rough sets" (2012) by Liu et al. provided the two-stage algorithm in which the first stage includes the related art one-versus-rest mapping, and the second stage chooses the best candidate classification in the positive region by using the minimum probability error criterion with the Bayesian discriminant analysis. "Multi-class decision-theoretic rough sets" (2014) by Zhou provided the cost-sensitive solution to the multi-class decision by making use of the one-versus-rest approach. "A decision-theoretic rough set approach to multiclass cost-sensitive classification" (2016) by Deng and Jia determined several parameters in the multi-class DTRS based on the cost matrix, and demonstrated that their multiclass cost-sensitive classification algorithm derived from the Bayesian decision procedure is rather accurate in several UCI classification tasks.

One of the most widely used ways to define multi-class decisions is the rough Bayesian model which does not require information about the prior and posterior probabilities. The rough Bayesian model defines the positive, negative, and boundary regions for each decision class by using Bayesian Factor (BF), i.e., the ratio of conditional densities (likelihoods) (2) for pairwise disjoint classes is compared to a threshold $0 < \epsilon_{i,c} < 1$:

$$\frac{\max_{r \in \{1,\ldots,R\}, c(r)=c} f_r(x)}{\max_{r \in \{1,\ldots,R\}, c(r)=i} f_r(x)} > \epsilon_{i,c}. \quad (7)$$

By using transformations equations (3)-(6) from the previous section, one can find out that this criterion is equivalent to the following rule $$\Delta \rho_{i,c}(x) = \rho_i(x) - \rho_c(x) > \Delta_{i,c}, \quad (8)$$

By using such an approach, it is possible to define three regions for each class:

$$POS_{BF}(c) = \{x \in X | \forall_{i:i \neq c} \Delta \rho_{i,c}(x) > \Delta_{i,c}\}, \quad (9)$$

$$NEG_{BF}(c) = \{x \in X | \exists_{i:i \neq c} \Delta \rho_{c,i}(x) > \Delta_{c,i}\}, \quad (10)$$

$$BND_{BF}(c) = \{x \in X | \exists_{i:i \neq c} \Delta \rho_{c,i}(x) \leq \Delta_{c,i}\} \& (\forall_{i:i \neq c} \Delta \rho_{i,c}(x) \geq \Delta_{i,c})\}. \quad (11)$$

Here X is the universal set of images with width W and height H. These definitions implement the KL-based criterion for the statistical hypothesis testing in the case of full prior uncertainty $p_c = 1/C$.

Another approach to multi-categories problems was proposed in "Attribute reduction in decision-theoretic rough set models" (2008) by Yao and Zhao. They followed the one-versus-rest (r one-versus-all) approach and converted the C-class Bayesian decision procedure into C two-class classification problems that can be independently formulated in terms of the TWD theory by using confidence (posterior probability) of each decision class. This approach uses partition n of the universal set X into two classes, thereby indicating that an object is in decision class c and not in c. After that, TWD is performed individually for each class. Three sets are defined based on the estimates of posterior probabilities $\hat{P}(c|x)$ (4) as follows:

$$POS_\pi(c) = \{x \in X | \hat{P}(c|x) > P_0(c)\}, \quad (12)$$

$$NEG_\pi(c) = \{x \in X | \hat{P}(c|x) \leq P_1(c)\}, \quad (13)$$

$$BND_\pi(c) = \{x \in X | P_1(c) \leq \hat{P}(c|x) < P_0(c)\}, \quad (14)$$

where thresholds $P_1(c) < P_0(c)$, $c \in \{1, \ldots, C\}$ can be tuned based on the given loss functions for choosing different classes in different states.

In fact, such definition is very similar to the statistically optimal rule for the reject option that has been introduced by "On optimum recognition error and reject tradeoff" (1970) by Chow. The only difference with Yao and Zhao approach (12)-(14) is that the Chow's rule checks only reliability of the optimal decision (5), so it can be treated as (C+1)-way decisions that accept any of C classes or delay the decision process in case of an unreliable result (5). Applications of (C+1)-way decisions in facial recognition and speech classification have been studied. The most obvious way is to assign features of an observed image x to a c-th class if this image is included in the positive region (12) of only this class. Thus, there exist C positive regions $$POS_{(C+1)}(c) = POS(c) - \bigcup_{i \neq c} POS(i), \quad (15)$$

and only one boundary set $$BND_{(C|+1)} = X - \bigcup_{c=1}^{C} POS_{(C+1)}(c). \quad (16)$$

If POS(c) is defined by the Yao's approach (12), Chow's rule is obtained which has been empirically shown to efficiently reduce misclassification rate. However, application of the approach (9) is also possible in the considered case.

The most difficult problem of the described multi-category TWD models is the technical difficulty of tuning many different thresholds appropriately, especially for a large number of classes. These models have significant expressive power even for unified thresholds $\Delta_{i,c} = \Delta_0$, i, c $\in \{1, \ldots, C\}$ for BF (9)-(11) and $P_0(c) = P_0$, $P_1(c) = P_0$ for the Yao's approach (12)-(14). Unfortunately, even in this case, the parameter tuning is difficult in matching either distance difference (8) or posterior probabilities (12). Hence, it should be carefully repeated for every task/dissimilarity measure, etc. Next, discussed are the ways to overcome the deficiencies of these methods based on the multiple comparisons theory.

3. Proposed Method and Device According to One or More Embodiments 3.1. Three-Way Decisions Based on Multiple Comparisons In an embodiment, TWD regions are defined by fixing the type I error $0 < a < 1$ of a given image representing a c-th class. One possible way for the described statistical approach is to rely on the fact that 2n-times KL divergence between the feature vectors of the same class has the chi-squared distribution with (D−1) degrees of freedom in asymptotic (for large image resolution n=W·H). Thus, class c is accepted if $$2n\rho_c(x) < X_{1-a}^2, D-1, \quad (17)$$

Here $X_{1-a}^2, D-1$ is (1−a)-quantile of the chi-squared distribution with (D−1) degrees of freedom. In this case, the type I error is detected if the c-th instance is not assigned to this (positive) region (17).

Unfortunately, parameter a in the definition does not stand for the type I error of the simultaneous testing of all C hypothesis. As a matter of fact, the multiple comparisons problem takes place in the multi-category recognition, so appropriate correction is needed in equation 17. In an embodiment, the Benjamini-Hochberg testing that controls false discovery rate is used. At first, all distances (6) are ordered, class labels $c_1(x), \ldots, c_C(x)$ of the ordered sequence $\rho_{c_1}(x) \leq \rho_{c_2}(x) \leq \ldots \leq \rho_{c_C}(x)$ are obtained. Index $k_c(x)$ of each class c in this ordered sequence is stored, so that: $c_{k_c}(x) = c$.

According to Benjamini and Hochberg, it is necessary to introduce (C+1−i)/C correction of the type I error for acceptance of class $c_i$. Thus, TWD for multiple comparisons can be defined as follows:

$$POS_a(c) = \{x \in X | (2n\rho_c(x) < X_{1-a \cdot (C+1-k_c(x))/C, D-1}^2) \& (\forall_{i:i \neq c} 2n\rho_i(x) \geq X_{1-a \cdot (C+1-k_i(x))/C, D-1}^2)\}, \quad (18)$$

$$NEG_a(c) = \{x \in X | 2n\rho_c(x) \geq X_{1-a \cdot (C+1-k_c(x))/C, D-1}^2\}, \quad (19)$$

$$BND_a(c) = \{x \in X | (2n\rho_c(x) < X_{1-a \cdot (C+1-k_c(x))/C, D-1}^2) \& (\exists_{i:i \neq c} 2n\rho_i(x) < X_{1-a \cdot (C+1-k_c(x))/C, D-1}^2)\}, \quad (20)$$

In contrast to decision-making systems that can recommend several potential actions for a decision-maker, the recognition task involves the choice of only one class for an observed image. Hence, here accepted is no more than one class similarly to the BF approach (9)-(11). Thus, an image feature vector x belongs to $POS_a(c)$ if and only if c is accepted by the Benjamini-Hochberg procedure and all other classes are rejected. In such case, c is the optimal MAP decision (1), i.e., the NN class (5). The vector x belongs to $NEG_a(c)$ if and only if hypotheses about class c are rejected by the Benjamini-Hochberg procedure. In all other cases the feature vector x belongs to $BND_a(c)$.

Unfortunately, the proposed TWD (18)-(20) can hardly be used in practice, because the distance between real images of the same class is rather large and does not satisfy the theoretical chi-squared distribution with (D−1) degrees of freedom. Hence, the Benjamini-Hochberg procedure simply rejects all 230 classes. Thus, modifications of the described procedure are studied by using the known probability distribution of the KL divergence between different hypothesis. If image x corresponds to class c, 2n-times distance $\rho_i(x)$ for each other class i≠c is asymptotically distributed as the non-central chi-squared with (D−1) degrees of freedom and the non-centrality parameter $2n\rho_{c,i}$. Here $\rho_{c,i}$ is the distance between classes c and i that can be defined as the minimum distance between instances of these classes. As a result, the ratio of distances $\rho_i(x)$ and $\rho_c(x)$ has the non-central F-distribution $F((D-1), (D-1); 2n\rho_{c,i})$.

In the statistical pattern recognition there are only two potential decisions: accept MAP class $c_1(x)$ (5) or delay the decision process. Thus, the following definition of TWD is finally obtained:

$$POS_{(c)} = \left\{x \in X \mid (c = c_1(x)) \ \& \ \left(\forall_{i:i \neq c} \ \frac{\rho_c(x)}{\rho_i(x)} < \delta_{1/*}(i)\right)\right\}, \quad (21)$$

$$NEG|(c) = \left\{x \in X \mid \frac{\rho_{c1(x)}(x)}{\rho_c(x)} \geq \delta_{1/*}(c)\right\}, \quad (22)$$

$$BND(c) = \qquad\qquad\qquad\qquad\qquad\qquad\qquad\qquad (23)$$
$$\left\{x \in X \mid \left(\frac{\rho_{c_1(x)}(x)}{\rho_c(x)} < \delta_{1/*}(c)\right) \ \& \ \left(\exists_{i:i \neq c} \ \frac{\rho_{c_1(x)}(x)}{\rho_i(x)} < \delta_{1/*}(i)\right)\right\}.$$

Hence, thresholds $\delta_{1/*}(c)$ are chosen based on the assumption that i-th class is correct, so ratio $$\frac{\rho_{c_1(x)}(x)}{\rho_i(x)}$$

has the non-central distribution $F((D-1), (D-1); 2n\rho_{i,c1(x)})$. Further, thresholds $\delta_{1/*}(c)$ are chosen as $$\left(1 - \alpha \frac{C + 1 - k_c}{C}\right)$$

-quantile of this non-central F-distribution.

The proposed TWD for image recognition (21)-(23) is similar to the Slezak's model in "Rough sets and bayes factor" (2005), but distance factor (DF) is used instead of the ratio of conditional probabilities (BF). It is understood that though the equations were synthesized using the asymptotic properties of the Kullback-Leibler divergence, it can be used with an arbitrary dissimilarity measure by properly choosing thresholds $\delta_{1/*}(c)$ Such tuning can be implemented in a much more robust way as compared to BF (i.e., distance differences (8)) and the posteriors thresholding (12), because the ratio does not depend on the scale of the dissimilarity measure. For example, DF has been used in the conventional SIFT (Scale-Invariant Feature Transform) method in order to choose reliable matchings of SIFT descriptors. "Distinctive image features from scale-invariant key-points" (2004) by Lowe demonstrated that the DF threshold value equal to 0.8 eliminates 90% of false matches while discarding less than 5% of correct matches in many practical image processing tasks.

3.2. Sequential Three-Way Decisions

In typical closed-set image recognition tasks, exactly one class label is returned. It seems that the related art multi-category TWD, including the approach (21)-(23) described above, are useless in this case, because they cannot provide anything more accurate than the optimal MAP decision (5). However, the real power of TWD in the pattern recognition problem is its potential to significantly speed-up the classification procedure by using the sequential TWD. According to this idea, objects are described by L>1 granules, and three decision regions are assigned at each granularity level. Then, these granularity levels are sequentially analyzed from coarse-grained granules to fine-grained granules until the representation of the observed object at some granularity level is included in either positive or negative regions. If runtime complexity increases for finer granularity levels, this procedure implements the multilevel incremental processing which can significantly improve performance of the analysis of the finest granularity representation only.

According to an embodiment, in order to implement the sequential analysis with the multi-category TWD (21)-(23), granular approximations of images are defined. It is proposed to extract HOG features from image pyramids. However, this definition is not appropriate for modern deep CNN features that are used in Section 1 of the Detailed Description. Thus, much more typical subspace methods are examined.

In particular, PCA will be performed with respect to all feature vectors from the training set to obtain the D×D transformation matrix Φ. The number of PCA components equals the dimension D of deep features. As a result, instances $x_r$ are transformed to the D-dimensional vector $\tilde{x}_r = [\tilde{x}_{r;1}, \ldots, \tilde{x}_{r;D}] = \Phi \cdot x_r$ of linearly independent components (scores) ordered by corresponding eigenvalues. The same procedure is repeated for the input image features x in order to obtain its PCA transformation $\tilde{x} = [\tilde{x}_1, \ldots, \tilde{x}_D] = \Phi \cdot x$. Moreover, the proposed approach is concentrated on additive dissimilarity measures only, so that they can be expressed as a sum of distances between corresponding features:

$$\rho(\tilde{x}, \tilde{x}_r) = \sum_{d=1}^{D} \rho(\tilde{x}_d, \tilde{x}_{r,d}), \quad (24)$$

Such distances are typical in image recognition with deep CNN features. What is more important, their probability densities are well studied and can be approximated by the same chi-squared distribution used earlier for KL divergence.

Let us choose the number of granularity levels L to be a divisor of the total number of features D, so that m=D/L is an integer. For such a case it is proposed to define the representation of the input at a 1-th granularity level as a vector of its first lm principal components $\tilde{x}^{(l)}=[\tilde{x}_1, \ldots, \tilde{x}_{lm}]$. This representation is matched with a representation $\tilde{x}_r^{(l)}=[\tilde{x}_{r;1}, \ldots, \tilde{x}_{r;lm}]$ of every instance from the training set. In addition to the fact that this definition of granularity is straightforward, it is also very computationally cheap, because there is no need to match all components when the next (1+1)-th level is examined. Indeed, the additivity property of the dissimilarity measure (24) leads to compute only the distances between m new components:

$$\rho(\tilde{x}^{(l+1)}, \tilde{x}_r^{(l+1)}) = \rho(\tilde{x}^{(l)}, \tilde{x}_r^{(l)}) + \sum_{d=(l-1)m+1}^{lm} \rho(\tilde{x}_d, \tilde{x}_{r,d}). \quad (25)$$

As a result, in contrast to the related art implementations of the sequential TWD in pattern recognition, performance of the sequential processing at each granularity level is identical. Even the worst-case scenario with empty negative regions for all classes and every granularity level is only slightly slower than the two-way decision at the finest level, i.e. an exhaustive search (5).

Thus, the sequential TWD process in image recognition shown in FIG. 1 can be formulated.

FIG. 1 illustrates a proposed pipeline for multi-category image recognition based on sequential TWD and granular computing according to an embodiment.

According to an embodiment, the observed image is pre-processed, and deep CNN features are extracted. Then, only a small number m of principal components are analyzed at the coarsest approximation. All reference instances with rather large (22) intermediate distances (25) are rejected and will not be matched thereafter. If it is possible to obtain only one reliable class, i.e., the positive region (21) is not empty, the process is terminated and this class is returned as a result. Otherwise, next m principal components are matched, but the observed image is matched to instances of only those classes whose boundary region (23) includes said observed image. The process is repeated until the only one reliable solution (21) at the 1-th level is obtained. If decisions at all L granularity levels are unreliable, then the NN class (5) is merely return, as it is done in the general sequential TWD by using the two-way decision at the ground level.

At this point, the technique according to the proposed method is described in detail with reference to FIG. 2 and FIG. 3.

In order to reduce the number of parameters similarly to the applications of BF factors, all the DF thresholds are set herein to be identical: $\delta_{1/*}(c(r))=\delta_{1/*}$. The ratio between the distance to the NN (5) and distances to all the classes $p_c(x)$ has been checked in the procedure (21)-(23) described earlier. However, in the approach discussed presently, said rule is slightly modified by matching the minimum distance with distances to all instances $\rho(x, x_r)$. In the latter case, it is possible to early prevent further computation of distances to some instances with high $\rho(x, x_r)$, even if the input image is included in the positive (21) or boundary (22) regions of their classes due to closeness to another instance(s) of these classes.

Figure 2:
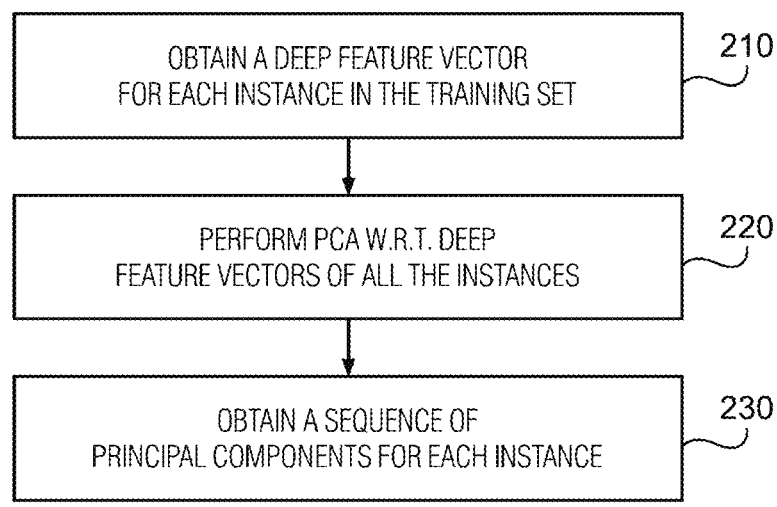
FIG. 2 illustrates a flowchart of preprocessing a gallery set according to an embodiment.

FIG. 2 illustrates a flowchart of preprocessing a gallery set, according to an embodiment.

As outlined above, the training image set includes instances, where each instance belongs to a particular class of a predefined number (≥2) of classes.

Referring to FIG. 2, in operation 210, for each instance of the training image set, a vector of deep features of the instance is obtained by a deep CNN, and the obtained vector is normalized in Euclidean norm. As noted previously, said vector is extracted at the output of the penultimate layer of the deep CNN.

In operation 220, PCA is performed with respect to vectors of deep features of all the instances to obtain a transformation matrix. The transformation matrix is a square D×D matrix, where D is the dimension of each deep feature vector. The transformation matrix is stored thereafter.

In operation 230, a sequence of principal components for each instance is obtained by multiplying the transformation matrix by the vector of deep features of said instance. Principal components in every obtained sequence are ordered by corresponding eigenvalues.

Figure 3:
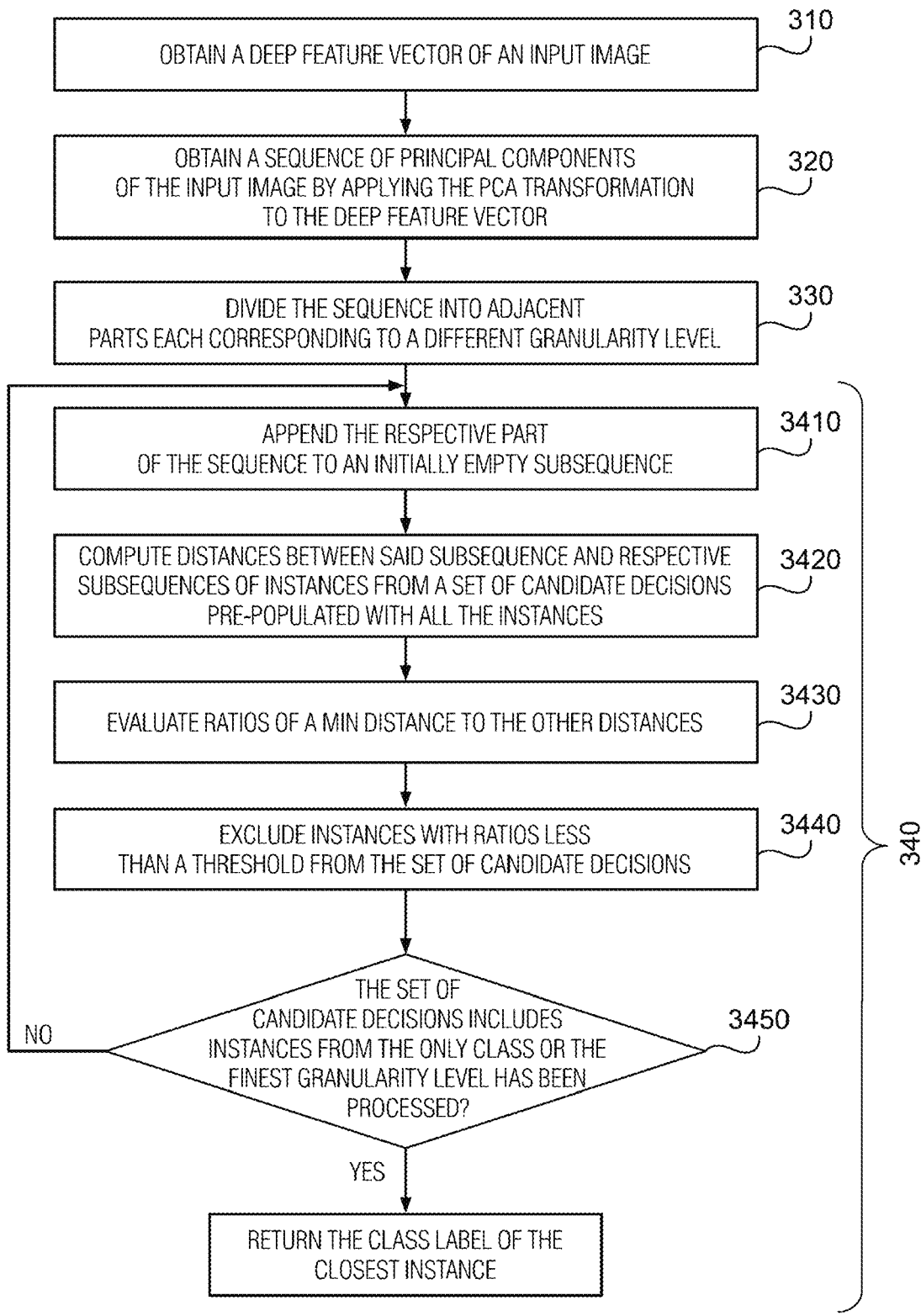
FIG. 3 illustrates a flowchart of image recognition according to an embodiment.

FIG. 3 illustrates a flowchart of image recognition according to an embodiment.

Referring to FIG. 3, in operation 310, a vector of deep features of an input image is obtained by the deep CNN, in a way similar to operation 210. In particular, the extracted deep feature vector is also normalized in Euclidean norm.

In operation 320, the PCA transformation is applied to the obtained vector in order to obtain a sequence of principal components of the input image. In particular, said sequence is obtained by multiplying the pre-stored transformation matrix (from operation 220) by the vector of deep features of the input image. The principal components in the obtained sequence are also ordered by corresponding eigenvalues.

In operation 330, the obtained sequence of principal components is divided into a number of adjacent parts, where said number is the predefined number of granularity levels (L). As a result, each part is associated with a different granularity level. In an embodiment, L is chosen or determined in such a way that division of the dimension D of every deep feature vector by L results in an integer value m. In other words, in an embodiment, the parts of the obtained sequence each have the same size m. Nevertheless, this embodiment should not be construed as a limitation. In particular, in some implementations the sequence may be divided into non-equal parts.

In operation 340, the input image is matched to instances from a training image set. The matching is preceded by initially filling a set of candidate decisions with all the instances of the training image set. The operation 340 includes performing a loop over the granularity levels, where the following suboperations are carried out for each granularity level (1≤L), beginning from the coarsest granularity level (l=1).

In suboperation 3410, the 1-th part of the sequence of principal components of the input image is appended to a subsequence of principal components of the input image. The subsequence is initially empty before the beginning of the loop. In accordance with the aforesaid, said 1-th part is associated with the 1-th (i.e., current) granularity level and, in an embodiment, includes m principal components.

In suboperation 3420, distances between said subsequence and respective subsequences of principal components of instances from the set of candidate decisions are computed.

In suboperation 3430, ratios of a minimum distance to all the other distances among the computed distances are calculated.

In suboperation 3440, instances each having a calculated ratio associated therewith that is less than a predefined threshold are excluded from the set of candidate decisions. In an embodiment, the same predefined threshold is used for all the granularity levels.

In suboperation 3450, if the set of candidate decisions includes at least one instance from only one class, the input image is identified as pertaining to said class, a respective class label is returned, and the loop terminates. Otherwise, if for the last, finest granularity level 1=L the set of candidate decisions still includes instances from more than one class, an instance having a maximum calculated ratio is determined among the instances present in the set of candidate decisions, and the input image is identified as pertaining to a class that said instance belongs to, and a class label of this instance is respectively returned.

As discussed above, the distances in suboperation 3420 are computed in accordance with the equation 25. That is, at the (1+1)-th granularity level, 1≤l≤L, the distances are computed as:

$$\rho(\tilde{x}^{(l+1)}, \tilde{x}_r^{(l+1)}) = \rho(\tilde{x}^{(l)}, \tilde{x}_r^{(l)}) + \sum_{d=(l-1)m+1}^{lm} \rho(\tilde{x}_d, \tilde{x}_{r,d}).$$

where m=D/L; $\tilde{x}^{(l)}=[\tilde{x}_1, \ldots, \tilde{x}_{lm}]$, is the subsequence of principal components of the input image at the 1-th granularity level; $\tilde{x}_r^{(l)}=[\tilde{x}_{r;1}, \ldots, \tilde{x}_{r;lm}]$ is a subsequence of principal components of an r-th instance of the training image set at the 1-th granularity level; and $\rho(\tilde{x}^{(l)}, \tilde{x}_r^{(l)})$ is the distance between the d-th principal component of the input image and the d-th principal component of the r-th instance. As seen, the distances from the previous, 1-th, granularity level are reused when computing the distances at the current, (1+1)-th, granularity level.

Time complexity of the proposed method, which is O(RD) in the worst case, is identical to the brute force of equation 5. Computing efficiency in the best case of empty boundary regions (23) for all categories at the coarsest granularity level can be defined as O(RD/L). The estimate of performance in average case requires analysis of values of the cumulative density function of the abovementioned non-central F-distributions at point $$\frac{1}{\delta_{1/*}}.$$

For simplicity, it is assumed that a percentage of non-committed (23) instances at each level is equal to constant γ∈(0; 1]. Then, runtime complexity of the proposed method as introduced referring to FIG. 2 and FIG. 3 can be estimated as follows:

$$O\left(\frac{RD}{L}\sum_{l=1}^{L}\gamma^{l-1}\right) = O\left(\frac{RD(1-\gamma^L)}{L(1-\gamma)}\right).$$

Figure 4:
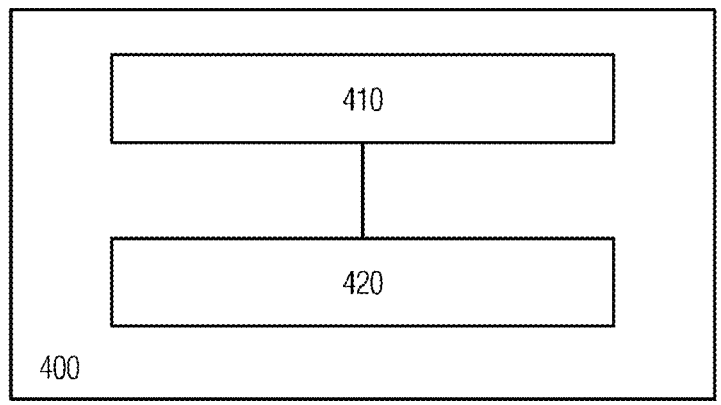
FIG. 4 illustrates a high-level block diagram of a computing device according to an embodiment.

This estimation is usually an order of magnitude lower than complexity of the worst case in which γ=1. In fact, performance of the proposed approach should be much better when compared to either related art classifiers or implementations of the multi-class sequential TWD described above. As is understood by a normally skilled artisan, the disclosure above can be practiced by software and/or hardware, e.g., by instructions executed by at least one processor. In particular, FIG. 4 illustrates a high-level block diagram of a computing device 400 according to an embodiment. The computing device 400 includes at least a processor 410 and a memory 420 connected to the processor 410. The processor 410 may include one or more processors (CPUs) that may be general-purpose or special-purpose, commercially-available or custom processors. The memory 420 may include various computer-readable media and/or memory devices, both non-volatile (e.g., ROM, HDDs, flash-drives, etc.) and volatile (e.g., various kinds of RAM, etc.).

In the present embodiment, the memory 420 includes computer-readable storage media recorded with respective software. The software includes computer-executable instructions that, when executed by the processor 410, cause the processor 410 to perform the method according to an embodiment. Such software may be appropriately developed and deployed using programming technologies and environments.

It is understood that the computing device 400 may further include one or more other components, such as input/output (I/O) devices, communication interfaces, etc., and software, such as an operating system, protocol stacks, drivers, etc., that may be commercially available or custom. The computing device 400 may be capable of communicating with other computing devices and/or frameworks via networks by using known wired and/or wireless communication communication technologies.

It should be appreciated that the scope of the disclosure is defined by the following claims and their equivalents.

4. Experimental Results

In this section, examples of facial recognition and image categorization tasks are illustrated. The deep learning Caffe framework is applied to extract image features. All CNNs have already been trained (e.g., by their authors), so they are downloaded from official sites, including Caffe Model Zoo repository. Squared Euclidean distance of PCA features, which can be written in the form (24) suitable for additive decomposition (25), is used herein.

Since the proposed approach is concentrated mainly on recognition performance, the proposed method introduced referring to FIG. 2 and FIG. 3 has been compared to the (C+1)-way decisions (15), (16) with the definition of granularity levels. In the latter approach, reliability of decisions has been checked using the following methods:
1. Chow's rule of "On optimum recognition error and reject tradeoff" (1970) with the estimate (4) of posterior probability (12)-(14);
2. Matching of distance difference (8) with a threshold inspired by the BF multiclass decisions;
3. Matching of DF (21)-(23), wherein all classes are examined at each granularity level using equations 15 and 16.

In the case of (C+1)-way decisions, L=2 granularity levels are used. At the coarsest level m=64 principal components are analyzed. The finest granularity level in all sequential TWDs including the proposed approach referring to FIG. 1 is described by principal components, i.e., it is usually less than the total number of features D in order to make this approach as fast as possible. For simplicity of tuning, all the thresholds are set to be equal to each other for each particular sequential TWD, so the thresholds do not depend on the class label c.

In addition, the NN method of equation 5 is examined in three variants, in particular, the matching of first 64, 256 and all D principal components. Also the multiclass classifiers implemented in the OpenCV library are used, in particular, RF and SVM with RBF kernel. In most cases, these parameters cannot be tuned using only training sets, because they are too small. Therefore, the extra VGG Flower and PubFig83 datasets are used in the present example to tune parameters in the image categorization and facial recognition tasks, respectively. Though it is possible to obtain better results when parameters are tuned with the same dataset as the training/testing set, it is not an obvious procedure, because it introduces a bias into testing results. At the same time, the absence of such tuning for each individual dataset can lead to slightly worse results, which are reported in publications available in the art.

The testing protocol for the datasets used in the experiments implements the following variant of the random subsampling cross-validation which is suitable to examine the small-sample-size case. Every dataset is divided randomly 10 times into the training and testing sets, so that the ratio of the training set size R to the size of the entire dataset T is equal to a fixed number. Each class is split independently in order to provide the approximately identical ratio of the number of images in the training and testing sets. The proposed method is focused on the small sample size problem, so the ratio R/T is chosen to be rather low. As all the datasets are imbalanced, accuracy of classifying images from each category is estimated individually, and mean error rate a is computed. In addition, average time to classify one image $\bar{t}$ (in ms) is measured on a special server (24 core Intel Xeon 3.47 GHz, 96 Gb RAM)

4.1. Unconstrained Face Recognition

This subsection is focused on the unconstrained face identification. Three publicly available CNN models are used: in particular, VGG-16 Network (VG-GFace), ResFace (ResNet-101 for face recognition), and Light CNN. The "fc7" layer of VGG-Face extracts D=4096 non-negative features from a 224×224 RGB image. The same image format is used to extract D=2048 features from the "pool5" layer of ResFace-101. Light CNN (version C) extracts D=256 (possibly negative) features at the "eltwise_fc2" layer from a 128×128 grayscale image.

The first part of this subsection is devoted to the Labeled Faces in the Wild (LFW) dataset with T=13233 photos of C=5749 persons. The classes with only one reference image have been placed into the training set. The images of all the remaining classes have been divided into two equally-sized parts to uniformly fill the training and testing sets. As a result, the training set contains R=8640 instances in average.

The proposed approach in FIG. 1 has been implemented in two variants: in particular, separate processing of all classes (21)-(23), and its simplified version with rejection of individual instances (see FIG. 2 and FIG. 3). At first, the possibility to tune the parameters of the proposed method is demonstrated, namely, DF threshold $\delta_{1/*}$ and granularity step m. The results for the VGGFace descriptor are shown in FIGS. 5A, 5B, 6A and 6B, respectively.

Figure 5A:
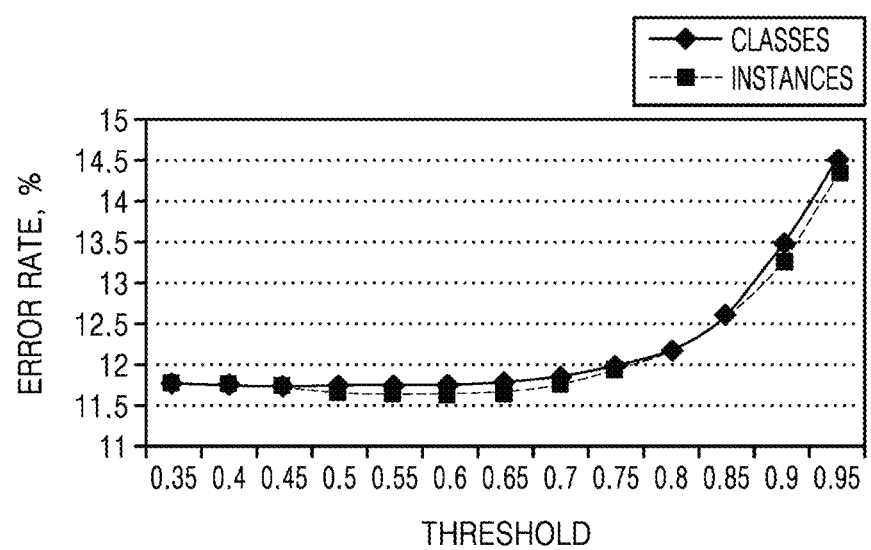
FIGS. 5A and 5B illustrate the dependence of error rate and recognition time on threshold value, according to an embodiment.
Figure 5B:
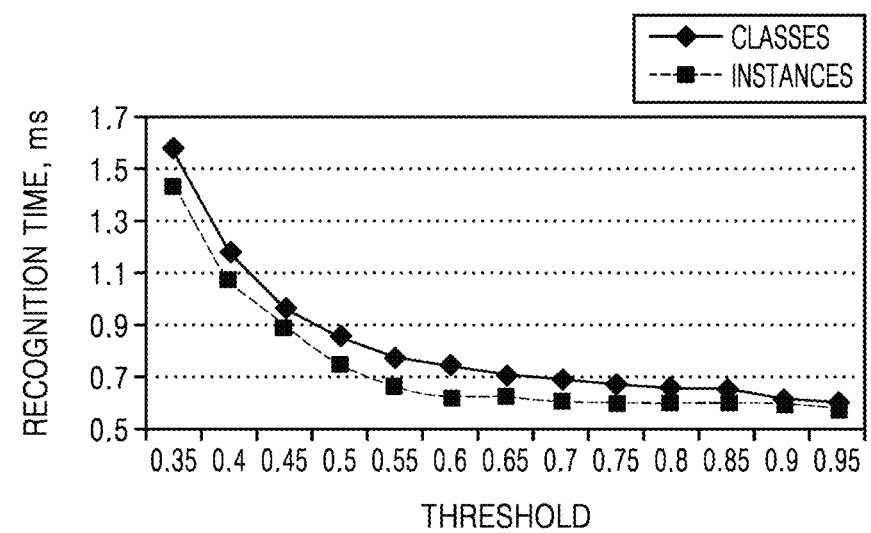
Figure 6A:
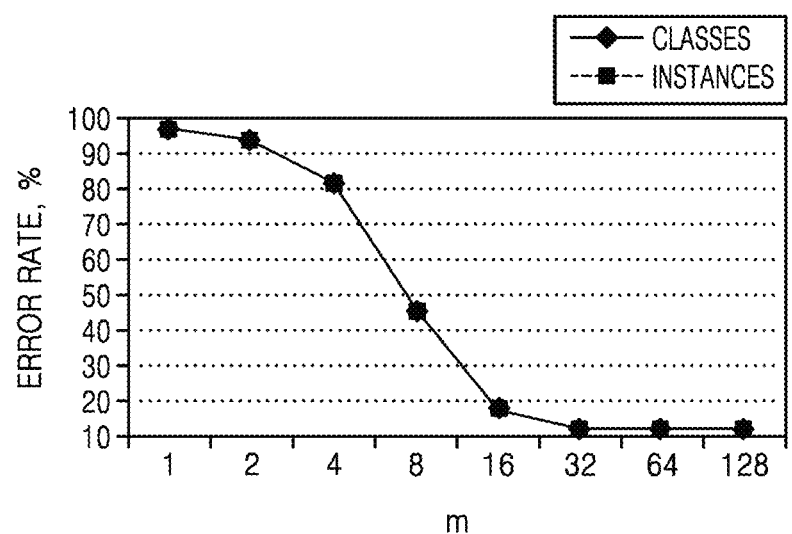
FIGS. 6A and 6B illustrate the dependence of error rate and recognition time on parameter m according to an embodiment.
Figure 6B:
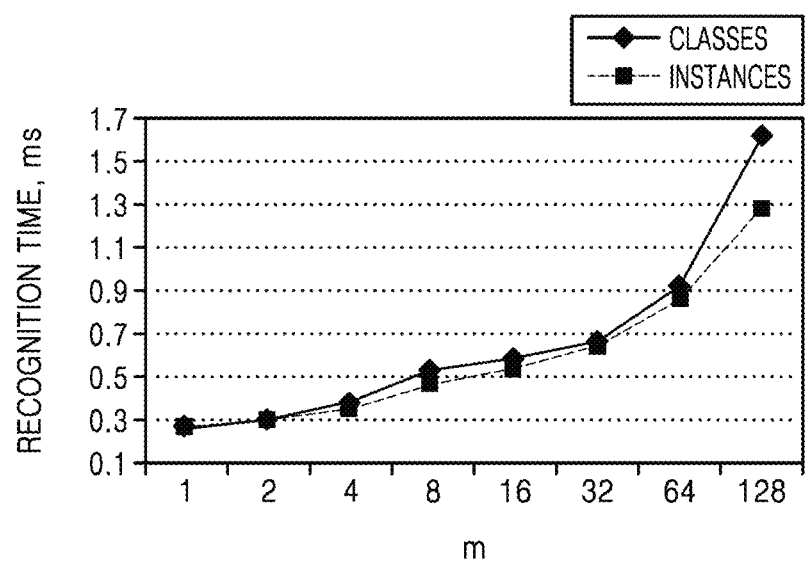

As expected, the greater the threshold $\gamma_{1/*}$, the less the recognition time is depicted in FIG. 5B, but the higher the error rate in FIG. 5A. However, accuracy does not change significantly if $\delta_{1/*} \geq 0.7$, so 0.7 will be used as the threshold value in the detailed description.

Then, a very large number of granularity levels L (and, as a consequence, low m) leads to inaccurate decisions, because in simple experiments the thresholds do not depend on a granularity level 1, though, in theory, the number of features ml as the degrees of freedom in the non-central F-distribution should be used. However, it is enough to choose m=32 or m=64 to accurately recognize facial images.

Moreover, though accuracy in the case of rejecting both classes and instances is approximately the same, recognition time in the latter case is 0.1-0.2 ms lower. Hence, in further experiments only TWD for individual instances will be used, as it is described referring to FIG. 2 and FIG. 3.

The results of all the experiments with the LFW dataset are summarized in Table 1 below.

Here the following conclusions can be made. First, accuracy of the related art RF and SVM classifiers is insufficient due to the effects caused by very small samples.

TABLE 1

Face recognition results, LFW dataset

| Classifier | Light CNN | | VGGFace | | ResFace | |
|---|---|---|---|---|---|---|
| | α, % | $\bar{t}$, ms | α, % | $\bar{t}$, ms | α, % | $\bar{t}$, ms |
| SVM | 76.54 | 202.47 | 42.32 | 196.49 | 46.44 | 196.27 |
| RF | 37.69 | 0.29 | 76.76 | 0.27 | 77.93 | 0.44 |
| NN, all features | 5.93 | 2.34 | 11.43 | 33.41 | 21.44 | 20.51 |
| NN, 256 features | 5.93 | 2.34 | 11.6 | 3.45 | 21.55 | 3.66 |
| NN, 64 PCA features | 9.7 | 0.59 | 12.2 | 0.75 | 22.69 | 1.22 |
| TWD (15), (16), posteriors (4) | 5.95 | 1.34 | 11.67 | 2.05 | 21.59 | 3.13 |
| TWD (15), (16), BF (8) | 5.96 | 1.41 | 11.67 | 1.78 | 21.18 | 5.27 |
| TWD (15), (16), DF (22) | 6.03 | 1.18 | 11.67 | 1.72 | 21.64 | 2.6 |
| Proposed TWD, m = 32 | 8.64 | 0.7 | 11.85 | 0.73 | 21.81 | 0.92 |
| Proposed TWD, m = 64 | 5.74 | 0.85 | 11.64 | 0.84 | 21.33 | 1.44 |

Moreover, the one-versus-rest implementation of the multi-class SVM is very slow due to the sequential processing of all classes. Second, the PCA preprocessing is rather efficient, because only 256 principal components is enough to recognize images with practically the same accuracy as of the brute force approach that involves matching of all D features. Third, the NN method with only 64 features at the coarsest granularity level cannot provide an accurate decision. However, the sequential TWD with m=64 features at the coarsest granularity level can decrease error rate without much loss in performance. The distance difference in BF (9)-(11) is slightly faster than the related art approach (12)-(14), because the latter includes rather difficult computations of posterior probabilities (4).

It is important to highlight that the distance ratio (21)-(23) proposed approach according to one or more embodiments is the most robust among the ways to define the multi-category TWD. For example, though the DF is as fast as the other variants for the VGGFace descriptor, it is much faster than the existing variants for the Light CNN and the ResFace features. In fact, setting the threshold as $\delta_{1/*}=0.7$ enables to filter out unreliable solutions for all used descriptors. Finally, the implementation of the sequential TWD according to one or more embodiments (see FIG. 2 and FIG. 3) with the DF definitions of TWD (21)-(23) enables increased recognition speed 2.5-4 times as compared to the NN with 256 PCA features. Moreover, the approach according to one or more embodiments is 1.5-2.5 times faster than the related art sequential (C+1)-way decisions (15), (16). It is remarkable that m=32 in the approach according to one or more embodiments is inaccurate for small-dimensional Light CNN features, but is enough to reach rather low error rate for high-dimensional VGGFace and ResFace descriptors.

In the next experiment, T=81132 images from C=1000 first classes of the CASIA-WebFace facial dataset are considered. About one-third of this dataset (R=25000 images)

populate the training set, the other images are placed into the testing set. The results are presented in Table 2.

TABLE 2

Face recognition results, subset of CASIA-WebFaces

| | Light CNN | | VGGFace | | ResFace | |
|---|---|---|---|---|---|---|
| Classifier | α, % | t̄, ms | α, % | t̄, ms | α, % | t̄, ms |
| SVM | 25.95 | 44.41 | 21.25 | 27.44 | 11.98 | 25.02 |
| RF | 55.71 | 0.73 | 76.83 | 0.31 | 38.87 | 0.38 |
| NN, all | 23.67 | 9.74 | 20.68 | 104.4 | 13.17 | 55.29 |
| NN, 256 features | 23.67 | 9.74 | 20.63 | 15.97 | 13.28 | 18.78 |
| NN, 64 PCA features | 28.24 | 4.32 | 21.37 | 6.45 | 13.94 | 7.39 |
| TWD (15), (16), posteriors (4) | 23.74 | 9.91 | 20.63 | 19.78 | 13.28 | 16.34 |
| TWD (15), (16), BF (8) | 23.85 | 9.66 | 20.64 | 21.28 | 13.32 | 16.97 |
| TWD (15), (16), DF (22) | 23.83 | 8.47 | 20.68 | 12.35 | 13.36 | 12.37 |
| Proposed TWD, m = 32 | 26.09 | 2.58 | 20.71 | 3.18 | 13.4 | 4.89 |
| Proposed TWD, m = 64 | 23.69 | 4.89 | 20.62 | 6.56 | 13.27 | 8.23 |

In contrast to the previous experiments, the error rate of the related art SVM is rather low here. For example, it is the best classifier for ResNet features.

However, computing efficiency of SVM remains poor. It is important that LightCNN, which has been the most accurate descriptor for the LFW dataset (Table 1), produces the worst features in this experiment. It seems that there is no available facial descriptor in the related art that would be the best in all scenarios. Thus, the related art matching of posterior probabilities and ratio of conditional densities (difference of distances) does not enable to improve performance of the ground granularity level (NN with 256 principal components).

However, the proposed DF (22) according to one or more embodiments, even in (C+1)-way decisions, is 1.2-2 times more efficient as compared to the related art multi-category TWD definitions. It is remarkable that the latter methods are even slower than the ground level processing (NN with 256 features) due to the low number of rejected decisions. This can be explained by the abovementioned difficulties in robust estimate of thresholds, which seem not so challenging in the distance ratio criteria (21)-(23). Moreover, the implementation of the sequential TWD according to one or more embodiments (see FIG. 2 and FIG. 3) is again the best classifier based on the NN search. It is 2-4 times faster than the best of the other algorithms, though accuracy is approximately equal to accuracy of the rather slow brute force (5).

4.2. Practical Example

A simple example of how the approach according to one or more embodiments improves accuracy of face recognition will now be described. One of the probe images FIG. 7(a) of an individual from the LFW dataset is recognized by using the setup described in the previous subsection. The extracted area with the Light CNN features. L=4 granularity levels are considered, with m=64 new principal components per level. The minimum distances and their ratios for several closest individuals from said gallery set at different levels are shown in Table 3.

The processing of the first 64 principal components at the coarsest granularity level l=1 provides the incorrect decision as seen in FIG. 7(b). However, the sequential analysis according to the approach introduced referring to FIG. 1 has not been terminated, because the boundary regions (23) of 6 classes presented in Table 3 are not empty, since DF (column 3 in this table) exceeds the threshold $\delta_{1*}$=0.7.

TABLE 3

Figure 7:
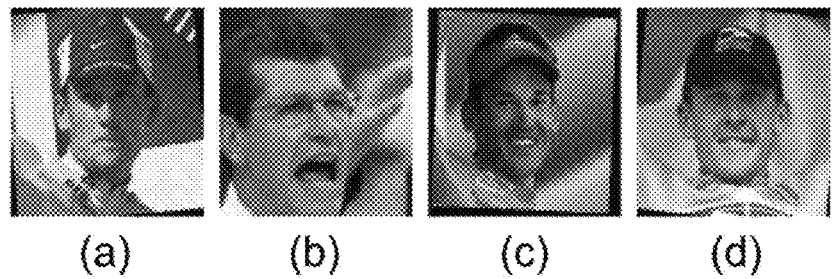
FIG. 7 illustrates images from a face recognition example, according to an embodiment.
Figure 8A:
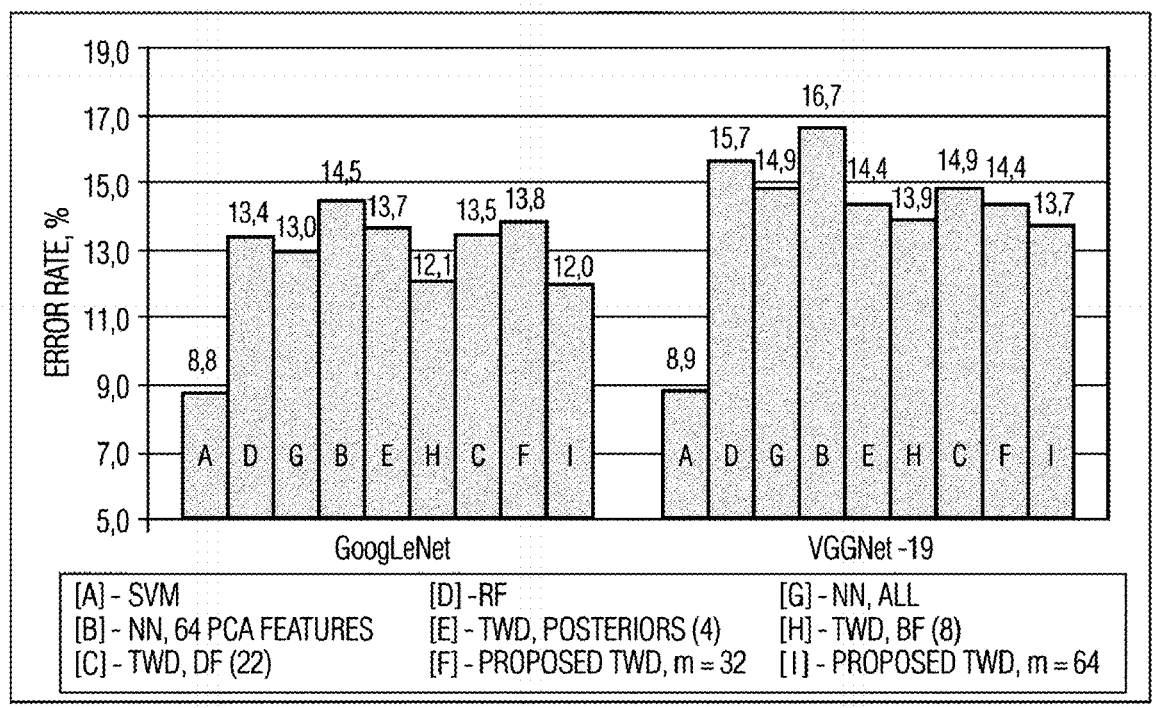
FIGS. 8A and 8B illustrate image categorization results showing error rate and recognition time, according to an embodiment.
Figure 8B:
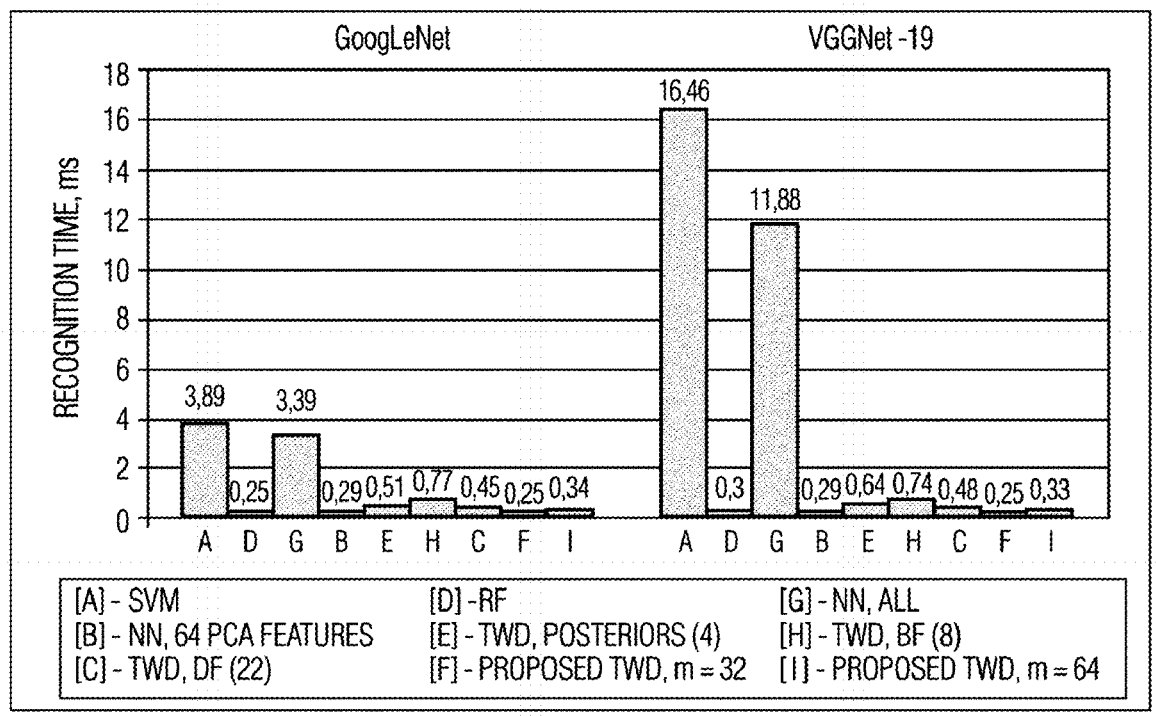
Figure 9A:
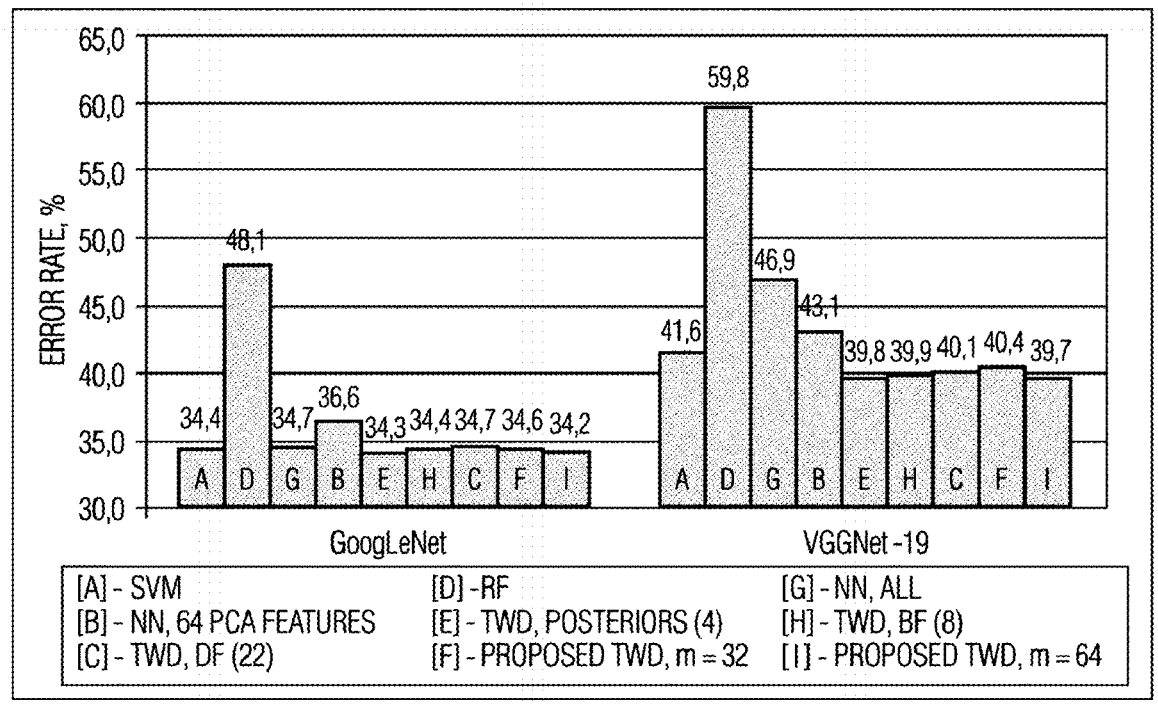
FIGS. 9A and 9B illustrate image categorization results of Caltech-256 dataset with error rate, and recognition time, according to an embodiment.
Figure 9B:
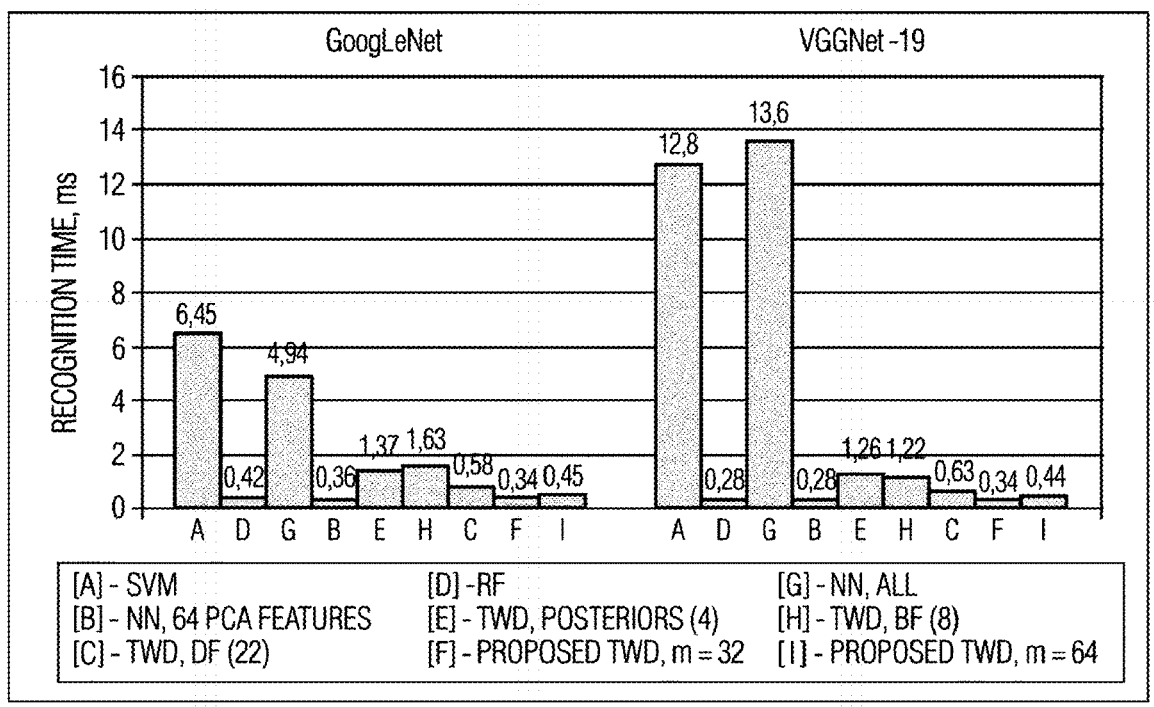
Figure 10A:
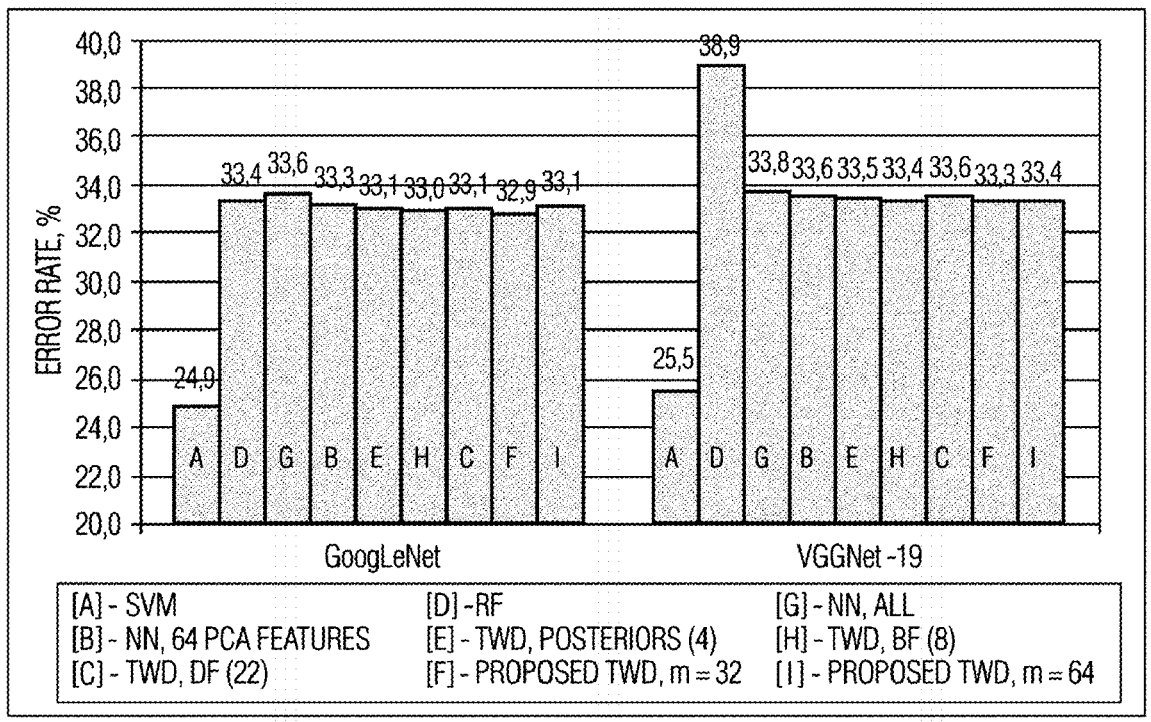
FIGS. 10A and 10B illustrate image categorization results of Stanford Dogs dataset with error rate and recognition time, according to an embodiment.
Figure 10B:
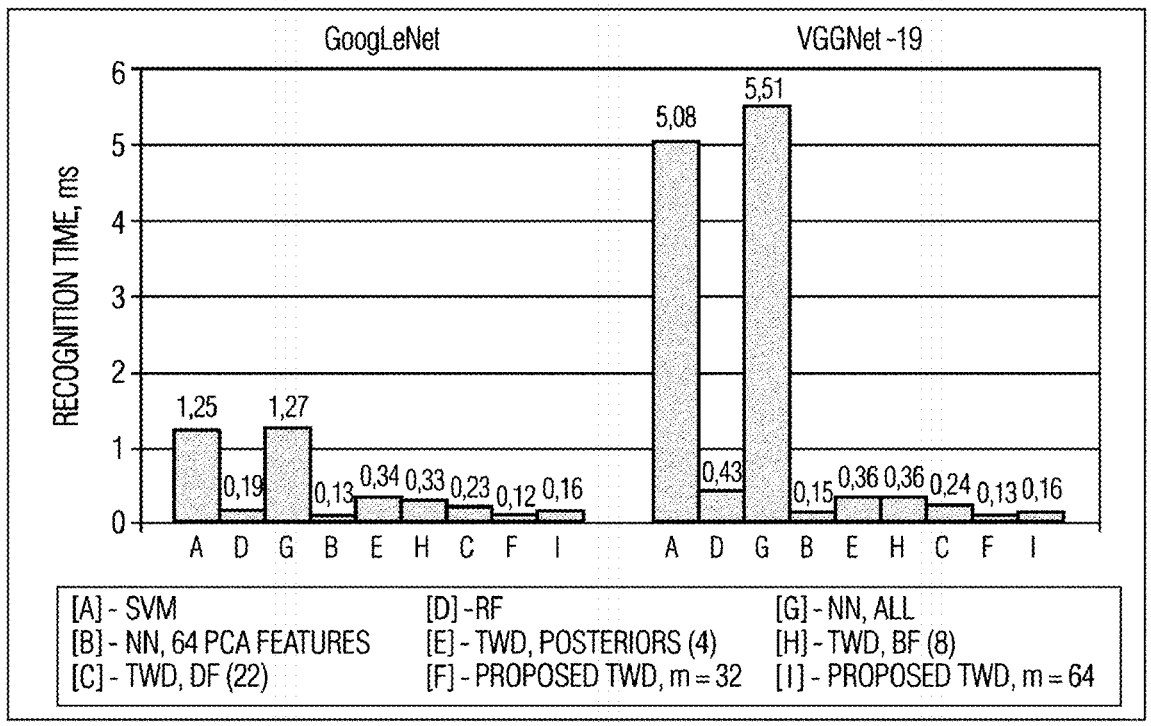
Figure 11A:
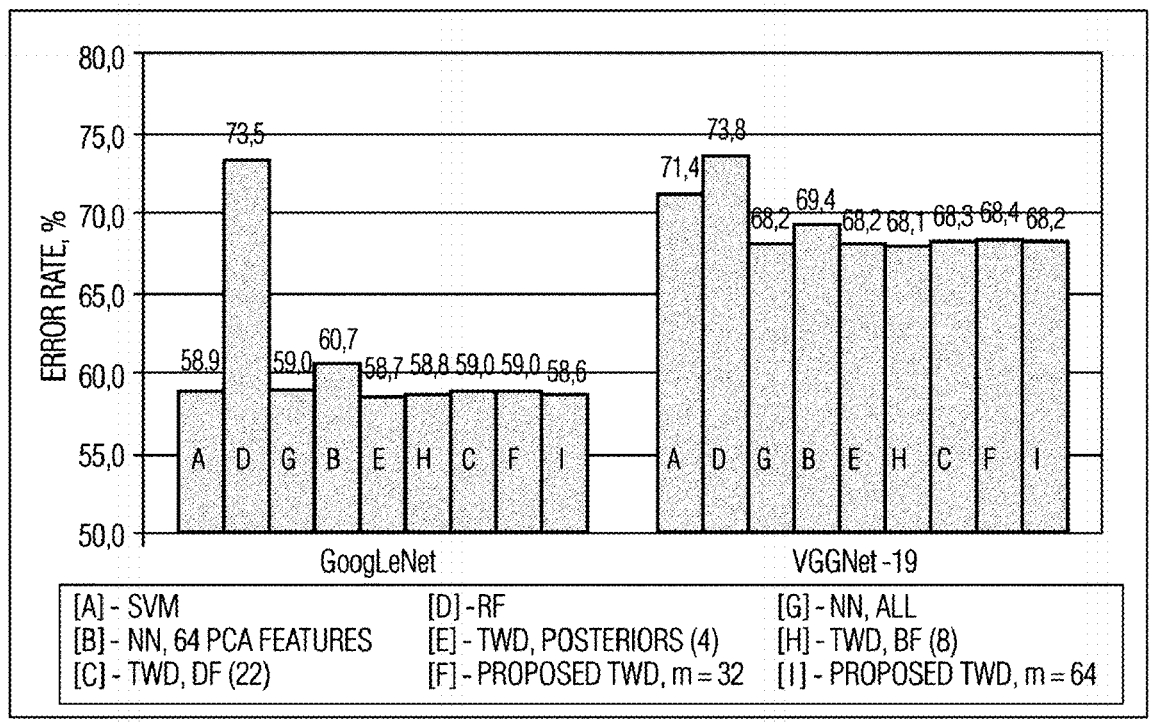
FIGS. 11A and 11B illustrate image categorization results of CUB-200-2011 dataset with error rate and recognition time, according to an embodiment.
Figure 11B:
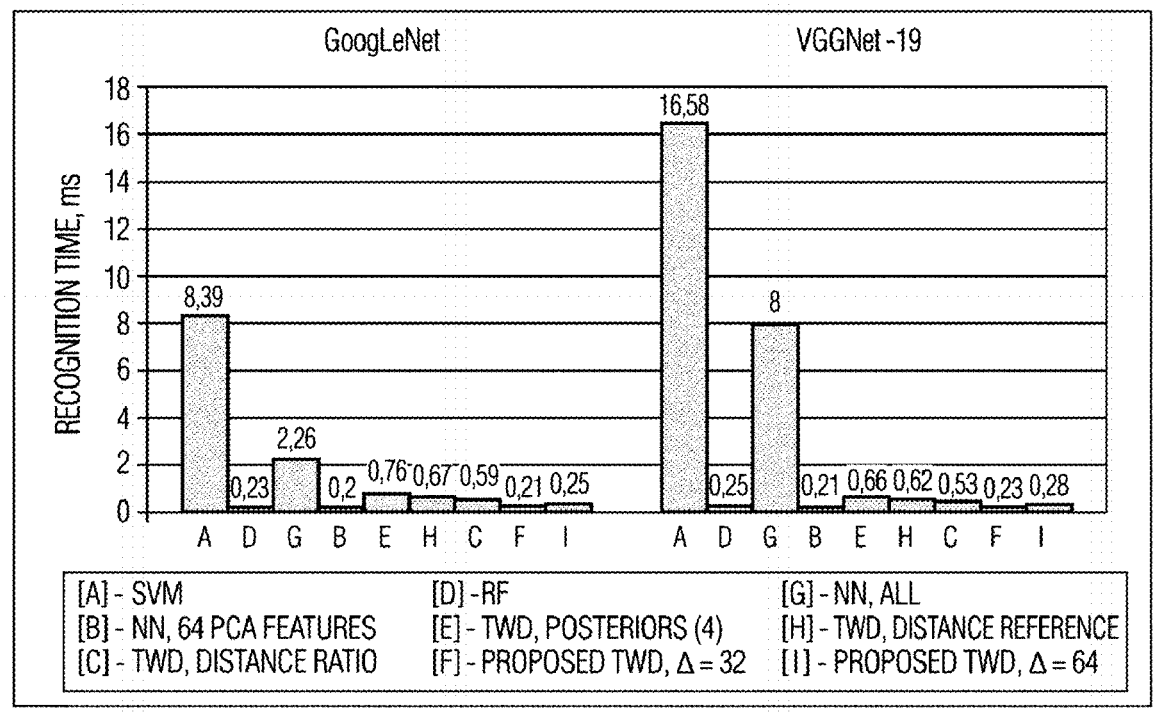

Results for recognition of Armstrong's face (FIG. 7 (a)), $\delta_{1/*}$ = 0.7

| | l = 1 | | l = 2 | | l = 3 | |
|---|---|---|---|---|---|---|
| Subject | ρ[r] | ρ$_{min}$/ρ[r] | ρ[r] | ρ$_{min}$/ρ[r] | ρ[r] | ρ$_{min}$/ρ[r] |
| Armstrong (FIG. 7(d)) | 0.0086 | 0.87 | 0.0122 | 1 | 0.0129 | 1 |
| Auriemma (FIG. 7 (b)) | 0.0074 | 1.00 | 0.0170 | 0.71 | 0.0195 | 0.66 |
| McEwen (FIG. 7(C)) | 0.0104 | 0.72 | 0.0188 | 0.65 | — | — |
| Williams | 0.0100 | 0.75 | 0.0300 | 0.41 | — | — |
| Wirayuda | 0.0103 | 0.73 | 0.0217 | 0.56 | — | — |
| LeBron | 0.0105 | 0.71 | 0.0200 | 0.61 | — | — |

The decision-making at the second granularity level has enabled to obtain the correct NN individual (FIG. 7 (d)). Moreover, the bounding regions of 4 classes become empty at this stage. However, the technique according to the disclosure (see FIG. 2 and FIG. 3) has not been terminated, because 2 potential decisions still exist (FIG. 7 (b) and FIG. 7 (d)). Only the information of 192 principal components at l=3 level is enough to make a reliable decision, because DF for Geno Auriemma (0.66) is less than the threshold $\delta_{1/*}$.

It is important to emphasize that the approach provided herein does not require analyzing all the D=256 features in this example. However, a hasty and incorrect decision has not been made after processing of the observed image (FIG. 7(a)) at the coarsest granularity level. Thus, the proposed technique enables to achieve a trade-off between recognition accuracy and performance, as seen from the experiments (Table 1 and Table 2) in the previous subsection.

4.3. Image Categorization

This subsection is devoted to the visual object category recognition task. Four datasets with rather large number of classes are used:

1. the Caltech 101 Object Category dataset which contains T=8677 images of C=102 classes, including the distractor background class. The training set contains R=3060 images.
2. the Caltech 256 dataset with T=29780 images of C=257 classes, including the clutter class. R=2570 images have been included into the training set.
3. the Stanford Dogs dataset with T=20580 images of C=120 classes R=1200 instances of which have populated the training set.
4. the CUB-200-2011 (Caltech-UCSD Birds) dataset with T=11788 images of C=200 bird types. 10 images per class are placed to the training set (R=2000). Though this dataset is primarily used in object detection problems, the images are cropped using bounding boxes provided by creators thereof in order to solve the related art image recognition task.

Domain adaptation techniques have been applied in order to extract image features in preliminary operations of the method according to the disclosure (see FIG. 2 and FIG. 3). Two deep CNN architectures (19-layer VGGNet and Inception v1 (or GoogLeNet)) have been downloaded from the Caffe Model Zoo repository. These CNNs have already been trained to recognize images of 1000 classes from the ImageNet dataset. Then, each RGB image from each dataset is provided to the input of these CNNs. The outputs of one of the CNN last layers ("pool5/7×7-s1" for Inception and "fc6" for VGGNet) are $L_2$-normalized in order to produce the final feature vector having the dimension D=1024 for Inception and D=4096 for VGGNet. All the experimental results are shown in FIGS. 8A, 8B, 9A, 9B, 10A, 10B, 11A, and 11B for the Caltech-101, Caltech-256, Dogs, and CUB-200-2011 datasets, respectively.

Though four different datasets are considered here, the main results remain very similar. At first, in contrast to the previous subsection, in these experiments there are enough images per each class to train the related art classifiers. In fact, SVM is the most accurate method in practically all cases. However, its runtime complexity is too high to be implemented in real-time, especially its hardware characteristics which cannot be compared with the server. RF remains a very fast method, but its accuracy is approximately equal to the accuracy of the other methods only in experiments with the Caltech-101 (FIGS. 8A and 8B) and Stanford Dogs (FIGS. 10A and 10B) datasets where SVM is 5-10% more accurate. Moreover, recognition time of TWD with the distance ratio (21)-(23) remains 20-100% less as compared to BF (9)-(11) and the Chow's rule (12)-(14) without any significant increase of error rate. The matching of distance differences (8) in some cases is even slower than the NN search for the considered finest granularity (256 features). Finally, the most important conclusion here refers to superiority of the sequential TWD (see FIG. 2 and FIG. 3) over the other NN-based classifiers: the proposed method is 4-10 times faster than the NN at the ground level (256 features) and is 1.5-3 times faster than the sequential (C+1)-way decisions with conventional definitions of the three regions (9)-(11) and (12)-(14). Once again, it is enough to start with examining only m=32 principal components, while decreasing the number of granularity levels (m=64 components per each level) allows to improve accuracy in most cases, though the degradation in decision-making time is not noticeable.

An image recognition process according to one or more embodiments, as described above, achieves significant acceleration. Depending on the number of classes in a training sample, the image recognition process can be accelerated by 1.5-10 times in comparison with related art counterparts.

It is understood that one or more embodiments are applicable to a wide range of image recognition tasks for which there is a large number of different classes (categories) and a relatively small number of reference images (patterns) available for each category. These tasks include, for example, tasks considered in the experimental section of face identification in photos and videos, wherein a potential search among photos of thousands of different people is performed. Another field of practice includes various tasks of searching for images in huge databases (content-based image retrieval).

It is understood that one or more of the above-described approaches and embodiments may be implemented by instructions stored on a non-transitory computer-readable medium and executable by at least one processor. A non-transitory computer-readable medium may refer to a medium that stores data semi-permanently or permanently, and is readable by machines (e.g., processor). Specifically, the aforementioned various applications or programs may be provided while being stored in a non-transitory computer-readable medium such as a CD, a DVD, a hard disc, a blue-ray disc, a USB, a memory card, a ROM and the like.

Further, while certain embodiments have been shown and described, the disclosure is not limited to the aforementioned embodiments, and it is apparent that various modifications can be made by those having ordinary skill in the technical field to which the disclosure belongs, without departing from the spirit and scope of the disclosure as claimed at least in part by the appended claims. Also, it is intended that such modifications are not to be interpreted independently from the technical idea or prospect of the disclosure.

ABBREVIATIONS

BF—Bayesian Factor
CNN—Convolutional Neural Network
DF—Distance Factor
DTRS—Decision-Theoretic Rough Set
HOG—Histograms of Oriented Gradients
MAP—Maximal A-Posterior
NN—Nearest Neighbour
PCA—Principal Component Analysis
RF—Random Forest
SIFT—Scale-Invariant Feature Transform
SVM—Support Vector Machine
TWD—Three-Way Decisions

What is claimed is:

1. A method of image recognition, the method comprising:
    obtaining a vector of deep features for each of instances from a training image set;
    obtaining a vector of deep features of an input image;
    applying a Principal Component Analysis (PCA) transformation to the vector of the deep features of the input image;
    obtaining a sequence of principal components of the input image;
    dividing the sequence of the principal components into a predefined number of adjacent parts, wherein the predefined number of the adjacent parts is a predefined number of granularity levels in the input image and each of the predefined number of the adjacent parts is associated with each of the predefined number of the granularity levels; and
    matching the input image to instances from the training image set.

2. The method of claim 1, further comprising:
    extracting the deep features of the input image; and
    normalizing the obtained vector of the deep features.

3. The method of claim 1, wherein each of the predefined number of the adjacent parts has a same size m.

4. The method of claim 3, wherein the predefined number of the granularity levels is determined by dividing a dimension of the vector of the deep features by the size m.

5. The method of claim 1, wherein the matching of the input image to the instances comprises performing a loop from l=1 to l=m (where 1≤l≤m, and l represents a fine degree of the granularity levels), the performing of the loop comprising:
    appending 1-th (where 1≤l≤m) part of the sequence of the principal components of the input image to a subsequence of the principal components of the input image, wherein m is a size of the predefined number of the adjacent parts;
    computing distances between the subsequence and respective subsequences of principal components of the instances;
    calculating ratios of a minimum distance to the computed distances;
    excluding instances having a calculated ratio that is less than a predefined threshold; and
    identifying the input image as a relevant image in a class if, from the class, at least one instance having a calculated ratio that is greater than or equal to the predefined threshold exists and terminating the loop or identifying the input image as the relevant image in the class if, among the instances, an instance from a class having a greatest ratio when the granularity level reaches l=m.

6. The method of claim 1, further comprising:

normalizing the vector of the deep features for the each of the instances;

applying the PCA transformation to the vector of the deep features for the each of the instances to obtain a transformation matrix; and obtaining a sequence of principal components for the each of the instances by multiplying the transformation matrix by the vector of the deep features for the each of the instances.

7. The method of claim 6, wherein the obtaining of the vector of the deep features for the each of the instances from the training image set is performed by a deep Convolutional Neural Network (CNN).

8. The method of claim 6, wherein the transformation matrix is a square matrix having dimensions equivalent to a dimension of the vector of the deep features.

9. The method of claim 1, wherein the obtaining of the sequence of the principal components of the input image comprises:

obtaining the sequence of the principal components of the input image by multiplying a transformation matrix by the vector of the deep features of the input image.

10. An apparatus for image recognition, the apparatus comprising:

a memory configured to store an input image; and a processor configured to execute instructions to:
obtain a vector of deep features for each of instances from a training image set;
obtain a vector of deep features of the input image,
apply a Principal Component Analysis (PCA) transformation to the vector of the deep features of the input image,
obtain a sequence of principal components of the input image,
divide the sequence of the principal components into a predefined number of adjacent parts, wherein the predefined number of the adjacent parts is a predefined number of granularity levels in the input image and each of the predefined number of the adjacent parts is associated with each of the predefined number of the granularity levels, and
match the input image to instances from the training image set.

11. The apparatus of claim 10, wherein the processor is further configured to execute the instructions to:
extract the deep features of the input image; and
normalize the obtained vector of the deep features.

12. The apparatus of claim 10, wherein each of the predefined number of the adjacent parts has a same size m.

13. The apparatus of claim 12, wherein the predefined number of the granularity levels is determined by dividing a dimension of the vector of the deep features by the size m.

14. The apparatus of claim 10, wherein the processor is further configured to execute the instructions to perform the matching of the input image to the instances by performing a loop from l=1 to l=m (where $1 \leq l \leq m$, and l represents a fine degree of the granularity levels), the loop comprising:

appending 1-th (where $1 \leq l \leq m$) part of the sequence of the principal components of the input image to a subsequence of the principal components of the input image, wherein m is a size of the predefined number of the adjacent parts;

computing distances between the subsequence and respective subsequences of principal components of the instances;

calculating ratios of a minimum distance to computed distances;

excluding instances having a calculated ratio that is less than a predefined threshold; and identifying the input image as a relevant image in a class if, from the class, at least one instance having a calculated ratio that is greater than or equal to the predefined threshold exists and terminating the loop or identifying the input image as the relevant image in the class if, among the instances, an instance from a class having a greatest ratio when the granularity level reaches l=m.

15. The apparatus of claim 10, wherein the processor is further configured to execute the instructions to:
obtain the vector of the deep features for each of the instances from the training image set;
normalize the vector of the deep features for the each of the instances;
apply the PCA transformation to the vector of the deep features for the each of the instances to obtain a transformation matrix; and
obtain a sequence of principal components for the each of the instances by multiplying the transformation matrix by the vector of the deep features for the each of the instances.

16. The apparatus of claim 15, wherein the transformation matrix is a square matrix having dimensions equivalent to a dimension of the vector of the deep features.

17. The apparatus of claim 10, wherein the processor is further configured to execute the instructions to obtain the sequence of the principal components of the input image by multiplying a transformation matrix by the vector of the deep features of the input image.

18. A non-transitory computer-readable medium configured to store instructions that, when executed by at least one processor, cause the at least one processor to control for:
obtaining a vector of deep features for each of instances from a training image set;
obtaining a vector of deep features of an input image;
applying a Principal Component Analysis (PCA) transformation to the vector of the deep features of the input image;
obtaining a sequence of principal components of the input image;
dividing the sequence of the principal components into a predefined number of adjacent parts, wherein the predefined number of the adjacent parts is a predefined number of granularity levels in the input image and each of the predefined number of the adjacent parts is associated with each of the predefined number of the granularity levels; and
matching the input image to instances from the training image set.

* * * * *